(12) United States Patent
Trubko et al.

(10) Patent No.: US 11,061,208 B2
(45) Date of Patent: Jul. 13, 2021

(54) COMPACT PANORAMIC CAMERA: OPTICAL SYSTEM, APPARATUS, IMAGE FORMING METHOD

(71) Applicant: RemoteReality Corporation, Windsor, CT (US)

(72) Inventors: Sergey Trubko, Shrewsbury, MA (US); Raghu Menon, Marlborough, MA (US); Yangiu (Julia) Zhu, Chepachet, RI (US); Mike Zwolinski, Westford, MA (US)

(73) Assignee: RemoteReality Corporation, Windsor, CT (US)

( * ) Notice: Subject to any disclaimer, the term of this patent is extended or adjusted under 35 U.S.C. 154(b) by 244 days.

(21) Appl. No.: 16/116,597

(22) Filed: Aug. 29, 2018

(65) Prior Publication Data

US 2019/0011678 A1 Jan. 10, 2019

Related U.S. Application Data

(63) Continuation of application No. 14/854,687, filed on Sep. 15, 2015, now abandoned.

(Continued)

(51) Int. Cl.
  *G02B 13/06* (2006.01)
  *G02B 17/00* (2006.01)
  (Continued)

(52) U.S. Cl.
  CPC ............. *G02B 13/06* (2013.01); *G02B 5/09* (2013.01); *G02B 5/208* (2013.01); *G02B 9/12* (2013.01);
  (Continued)

(58) Field of Classification Search
  CPC ........ G02B 13/06; G02B 13/18; G02B 17/08; G02B 9/12; G02B 5/09; G02B 5/208; G02B 17/023
  (Continued)

(56) References Cited

U.S. PATENT DOCUMENTS

| 2,244,235 A | 6/1941 | Ayres |
| 3,229,576 A | 1/1966 | Rees |

(Continued)

OTHER PUBLICATIONS

International Search Report and Written Opinion issued in corresponding application No. PCT/US2015/050169 dated Dec. 11, 2015.

(Continued)

*Primary Examiner* — Thong Q Nguyen
(74) *Attorney, Agent, or Firm* — Foley & Lardner LLP

(57) ABSTRACT

An optical system, apparatus, and method for sensing 360-degree horizontal and wide vertical field of view are shown. Powerful optics creates high resolution decompressed images on an image sensor. The compact panoramic camera includes two major optical components: (i) an axially symmetric convex aspheric reflector incorporated into a catadioptric optical element capable of providing a virtual curved image of a 360-degree panoramic scene with a specific image compression and (ii) a decompression lens with hardware aperture. The decompression lens is comprised of three single lens elements and accepts the virtual curved and compressed image and projects it onto the image sensor with high optical resolution and desirable image decompression to achieve a high digital resolution at the same time. Another version of decompression lens is comprised only of a single lens element and projects high resolution decompressed images onto an image sensor.

20 Claims, 39 Drawing Sheets

Related U.S. Application Data

(60) Provisional application No. 62/050,725, filed on Sep. 15, 2014.

(51) Int. Cl.
*H04N 5/232* (2006.01)
*G02B 13/18* (2006.01)
*G02B 9/12* (2006.01)
*G02B 17/08* (2006.01)
*G02B 5/09* (2006.01)
*G02B 5/20* (2006.01)
*G03B 37/06* (2021.01)
*G08B 13/196* (2006.01)

(52) U.S. Cl.
CPC ............. *G02B 13/18* (2013.01); *G02B 17/08* (2013.01); *G03B 37/06* (2013.01); *G08B 13/19628* (2013.01); *H04N 5/23238* (2013.01)

(58) Field of Classification Search
USPC .................................................. 359/725–732
See application file for complete search history.

(56) References Cited

U.S. PATENT DOCUMENTS

| | | | |
|---|---|---|---|
| 5,453,877 A | 9/1995 | Gerbe et al. | |
| 5,710,661 A | 1/1998 | Cook | |
| 5,956,178 A | 9/1999 | Furuta | |
| 5,982,549 A | 11/1999 | Kubala et al. | |
| 6,175,454 B1 | 1/2001 | Hoogland et al. | |
| 6,373,642 B1 | 4/2002 | Wallerstein et al. | |
| 6,426,774 B1 | 7/2002 | Driscoll, Jr. et al. | |
| 6,449,103 B1 * | 9/2002 | Charles | G02B 13/06 359/366 |
| 6,464,362 B1 | 10/2002 | Sugawara et al. | |
| 6,611,282 B1 | 8/2003 | Trubko et al. | |
| 6,744,569 B2 * | 6/2004 | Geng | G03B 17/00 359/725 |
| 7,336,299 B2 * | 2/2008 | Kostrzewski | G06T 3/0018 348/207.99 |
| 7,362,517 B2 | 4/2008 | Togino | |
| 2002/0141636 A1 | 10/2002 | Wakamoto et al. | |
| 2004/0264013 A1 | 12/2004 | Matsuki et al. | |
| 2009/0237657 A1 | 9/2009 | Warren | |
| 2010/0201781 A1 | 8/2010 | Trubko et al. | |
| 2010/0322059 A1 | 12/2010 | Yasui | |
| 2012/0104526 A1 | 5/2012 | Olsen et al. | |
| 2014/0022649 A1 | 1/2014 | Eckhardt | |

OTHER PUBLICATIONS

Extended Search Report issued in related European Patent Application No. 15841497, dated Jan. 26, 2018.

* cited by examiner

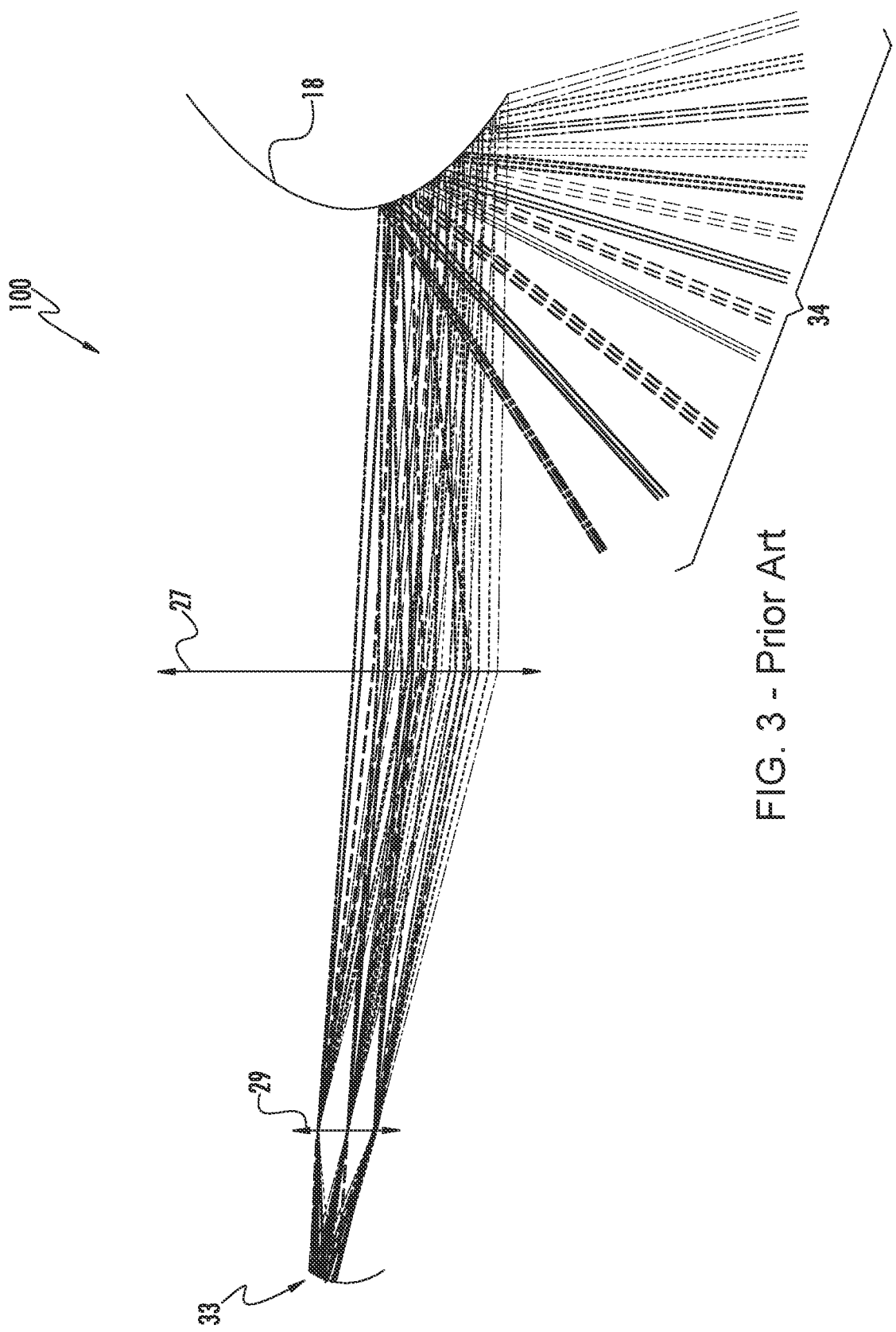
FIG. 3 - Prior Art

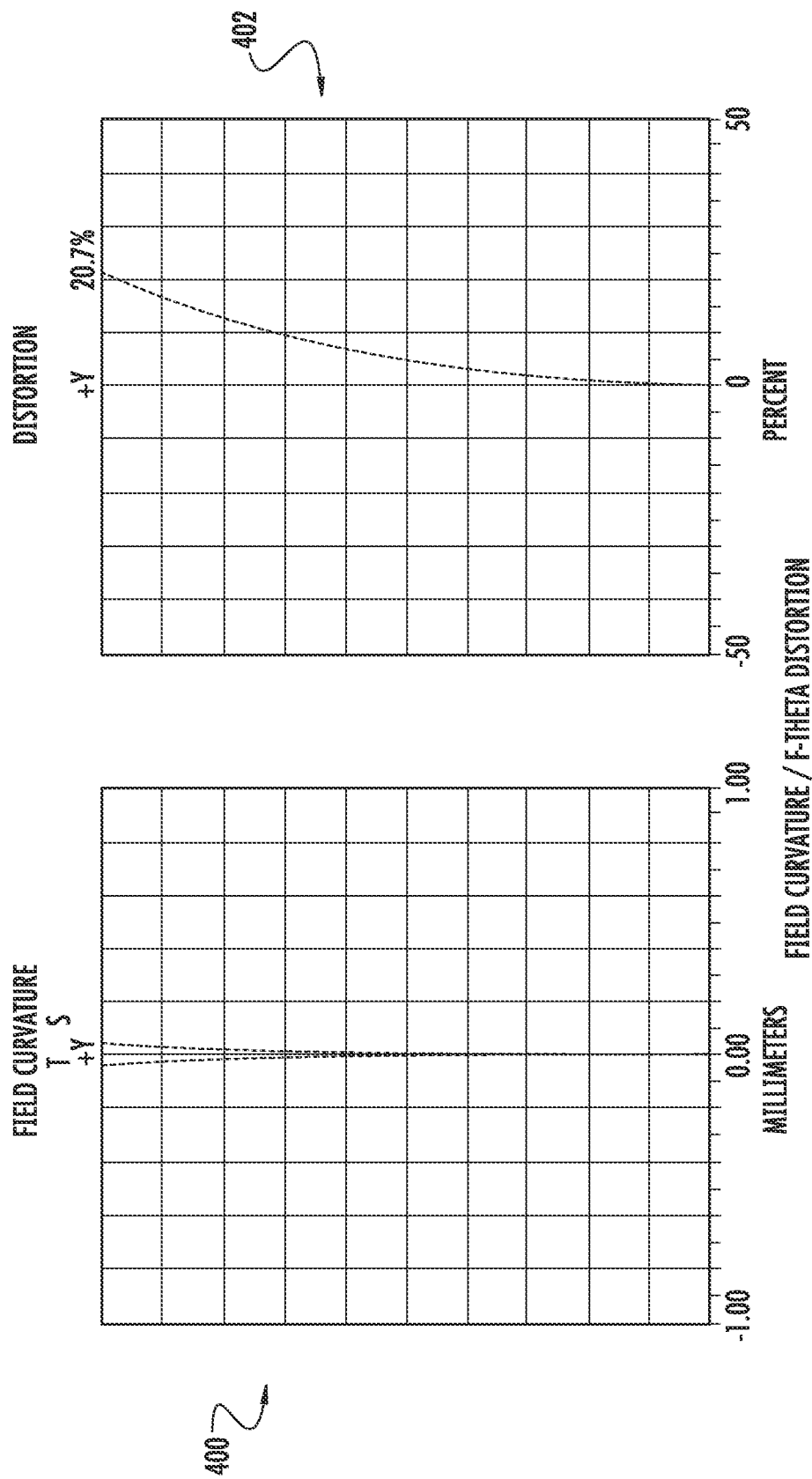
FIG. 4 - Prior Art

COMPACT PANORAMIC CAMERA: OPTICAL SYSTEM, APPARATUS, IMAGE FORMING METHOD

CROSS-REFERENCE TO RELATED APPLICATIONS

This application is a continuation of U.S. patent application Ser. No. 14/854,687, filed Sep. 15, 2015, which claims the benefit of and priority to U.S. Provisional Patent Application No. 62/050,725, filed Sep. 15, 2014, both of which are incorporated herein by reference in their entireties.

GOVERNMENT SUPPORT

The invention was made with U.S. Government support under grant nos. 1014213, 1103338, 1152652, and 1444880 awarded by the National Science Foundation. The U.S. Government has certain rights in the invention.

BACKGROUND

There are many panoramic imaging cameras and optical systems that use a variety of refractive and reflective optical components. The space of wide angle persistent visual imaging may be broadly segmented into single camera systems (e.g., fisheye and catadioptric systems) and multiple camera systems. Single camera systems are able to see a wider than usual field of view by introducing distortions in visual field in the form of a field compression function. One method uses wide field of view refractive-only optics (e.g., fish-eye lenses) to acquire a wide swath of the visual field around a camera. Refractive-only optics present a unique challenge when it comes to maintaining uniform (or minimum) quality at all points in the field of view. This is because the field-compression methods provided by refraction only are quite limited. At the same time, the field compression function of fish eye lenses is computationally complex and not fully reversible. Field compression by lenses alone also comes with a huge toll in terms of weight. The need for high-refractive dense meniscus lenses may alone drive the weight of the system up by an order of magnitude as compared with catadioptric systems.

Catadioptric optical systems may include one or more concave and/or convex mirrors and one or more refractive lens elements, usually placed behind the mirrors. These optical systems have been developed to achieve a super-wide-angle field of view and a wide range of field compression functions are possible with this method.

SUMMARY

One embodiment relates to a compact panoramic camera for sensing 360-degree field of view having a rotational axis of symmetry. The compact panoramic camera includes a convex reflector, a hardware aperture, and a decompression lens. The convex reflector has an axially symmetric aspheric surface. The convex reflector is configured to provide a virtual curved and compressed image of a 360-degree panoramic scene with a specific image compression. The hardware aperture is configured to filter out light rays other than those reflected directly from the convex reflector to provide a desirable compact object space viewpoint for prospective mapping of sensing images. The hardware aperture is positioned a distance from the convex reflector at or in a vicinity of a geometrical focus of the convex reflector. The decompression lens is positioned to receive the virtual curved and compressed image filtered by the hardware aperture. The decompression lens is configured to decompress the virtual curved and compressed image into a real image with a high optical resolution and a desirable image decompression, and project the real image onto an image sensor. The image sensor is positioned to receive the real image projected by the decompression lens of the 360-degree panoramic scene.

Another embodiment relates to a system for a compact panoramic camera having an image sensor. The system includes a convex reflector and a decompression lens. The convex reflector has an axially symmetric aspheric surface that provides a virtual curved and compressed image of a panoramic scene with a non-parabolic image compression. The decompression lens is positioned to receive the virtual curved and compressed image. The decompression lens is configured to decompress the virtual curved and compressed image into a real image with a high optical resolution and a parabolic image decompression, and project the real image onto the image sensor.

Still another embodiment relates to a method for compressing and decompressing an image with high resolution. The method includes receiving, by a catadioptric optical element, light ray bundles from a scene; compressing, by the catadioptric optical element, the light ray bundles into a virtual curved and compressed image with a non-parabolic compression; reflecting, by the catadioptric optical element, the virtual curved and compressed image onto a hardware aperture; filtering out, by the hardware aperture, light rays other than those reflected by the catadioptric optical element; receiving, by a decompression lens, the virtual curved and compressed image from the hardware aperture; decompressing, by the decompression lens, the virtual curved and compressed image into a real image; and projecting, by the decompression lens, the real image onto an image sensor.

Yet another embodiment relates to a decompression lens for use with a non-parabolic mirror and an image sensor in a catadioptric optical system. The decompression lens includes at least one lens element positioned to receive a virtual curved and compressed image in a non-parabolic compression format from the non-parabolic mirror. The at least one lens element is configured to decompress the virtual curved and compressed image into a real image with a high optical resolution and a parabolic type of decompression, and project the real image onto the image sensor.

Advantages and features of the embodiments of this disclosure will become more apparent from the following detailed descriptions of example embodiments when viewed in conjunction with the accompanying drawings.

BRIEF DESCRIPTION OF THE DRAWINGS

FIG. 3 is an ideal convex parabolic mirror based catadioptric optic.

FIG. 4 is a depiction of field curvature and distortion graphs for the arrangement of FIG. 3.

DETAILED DESCRIPTION OF THE PREFERRED EMBODIMENTS

Referring to figures generally, a compact panoramic camera with an optical system, apparatus, and image forming methods are shown. The system presented in the following disclosure may be used to provide a compact (i.e., miniaturized) panoramic camera with powerful optics and high resolution imaging. Compact may mean the total volume of the camera is three cubic inches or less. Powerful optics may mean that the camera has an optic aperture of f/2.8 or higher. High resolution imaging may mean that the camera has a polychromatic diffraction modulation transfer function (MTF) 30% or more for 150 cy/mm. Other qualities, dimensions, power levels, and resolution levels may be provided according to varying embodiments. The claims are not limited to any particular size, power, or resolution unless so expressly limited in the claims. The techniques are suitable for applications in teleconferencing, robotics vision, unmanned vehicles, medical endoscopy, or any other similar applications where it may be important to acquire live video imaging, not along, but perpendicular to the optical axis.

The compact panoramic camera optics includes two main optical components. The first optical component is a catadioptric optical element (COE). According to an example embodiment, the COE includes a convex reflector incorporated into a refractive lens between a first and a second refractive surface. The COE, as a result, has three optical surfaces: two refractive (dioptric) surfaces and one reflective (catoptric) surface. The second optical component is a decompression lens. According to an example embodiment, the decompression lens is made of at least one lens element (e.g., one lens element, three single lens elements (singlets), etc.), each having aspheric optical surfaces. With this design, a compact aspheric primary mirror structure, flat image surface field due to field curvature correction, and conversion of an aspheric image compression to a parabolic decompression may be achieved altogether. All of which may result in a compact panoramic camera with a powerful optical system comprising at most four optical elements, which may be made from a total of two plastic materials and provide high resolution images. The mirror design may also allow the reduction of its diameter by one-third or more of previously designed mirrors, and also decrease the camera volume to one-tenth of alternate systems.

Figure 1:
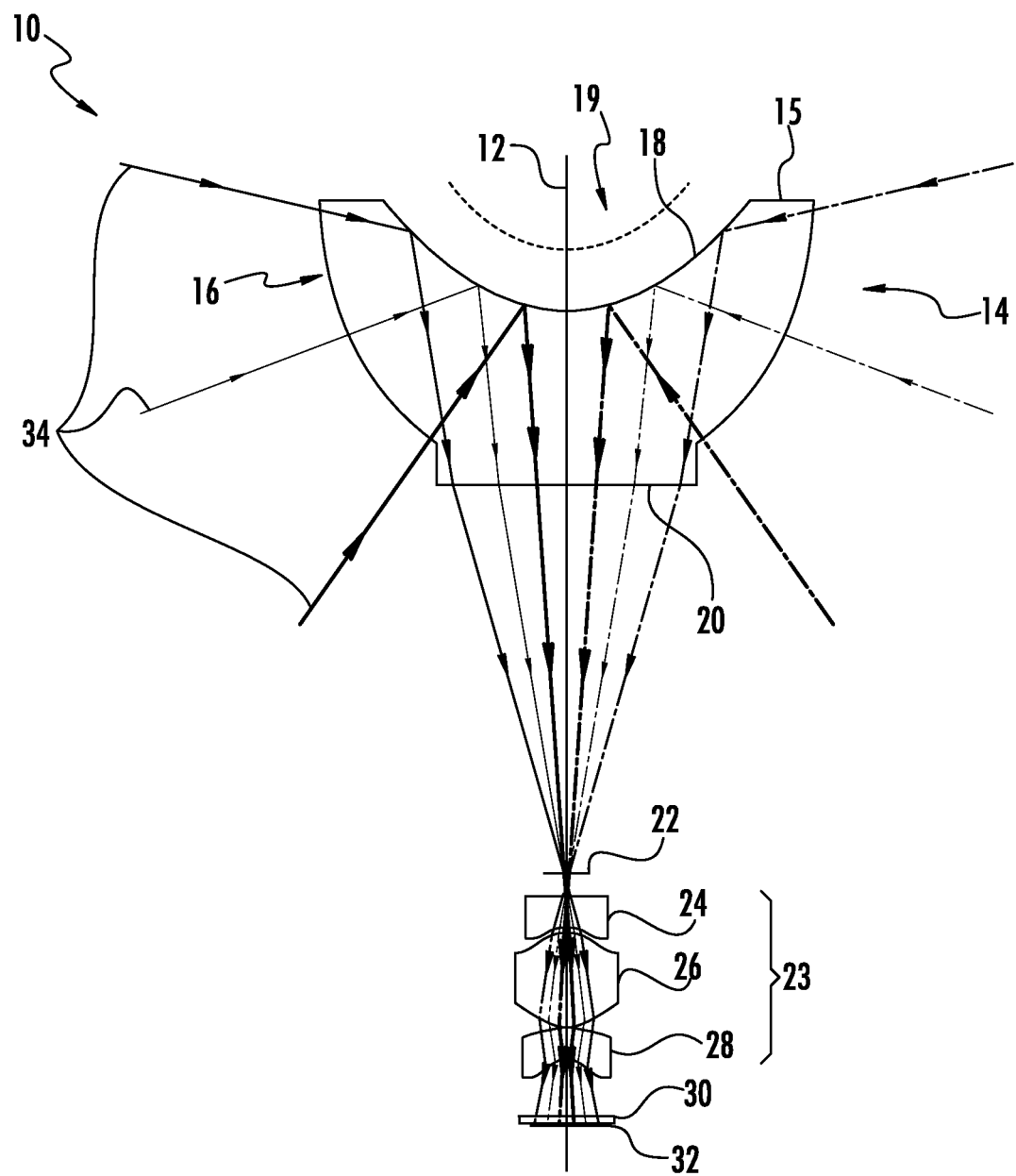
FIG. 1 is an optical system layout of a compact panoramic camera, according to an example embodiment.

Referring now to FIG. 1, an optical system layout of a compact panoramic camera is shown, according to an example embodiment. According to the example embodiment shown in FIG. 1, an optical system 10 includes two main optical components: a catadioptric optical element (COE) 14 and a decompression lens 23. The optical system 10 may further include a hardware aperture 22, a cover glass 30, and an image sensor 32. All of the optical elements of the optical system 10 are shown as centered relative to a vertical optical axis 12, which is the axis of symmetry. According to the example embodiment shown in FIG. 1, the COE 14 includes three optical surfaces: a first optical surface, shown as first refractive surface 16, a second optical surface, shown as convex reflector 18, and a third optical surface, shown as second refractive surface 20. In one embodiment, the first refractive surface 16 is structured as an ellipsoidal refractive surface (i.e., an ellipsoidal lens). The advantage of the ellipsoidal surface over a spherical surface may be a flatten barrel edge 15, which may allow the COE 14 to be removed from a mold form relatively easier if the method of fabrication used to construct the COE 14 is plastic molding. In other embodiments, the first refractive surface 16 is another shape (e.g., spherical, hyperbolic, parabolic, or high order aspheric). In one embodiment, the convex reflector 18 has a convex hyperbolic surface. In other embodiments, the convex reflector 18 has another shape (e.g., high order aspheric shape, spherical, parabolic, etc.). In one embodiment, the second refractive surface 20 is a spherical refractive surface (i.e., a spherical lens). In other embodiments, the second refractive surface 20 is another shape (e.g., aspheric, hyperbolic, parabolic, etc.).

According to an example embodiment, the COE 14 has a maximum diameter of 32.4 millimeters (mm) and a focal length of minus 5.0 mm. Thus, the optical system 10 may create a virtual curved and compressed image 19 of object space points positioned behind the convex reflector 18 (i.e., indicated by the negative focal length). In other embodiments, the diameter and focal length of the COE 14 are another size and length (e.g., a 30 mm diameter and a minus 3.5 mm focal length, etc.). The other surfaces of COE 14, such as the flatten barrel edge 15, are mechanical surfaces which may be used to facilitate mounting the COE 14 within a camera housing (not shown) and/or to the decompression lens 23.

According to the example embodiment shown in FIG. 1, the decompression lens 23 includes three lens elements: a first lens element, shown as first negative lens element 24, a second lens element, shown as positive lens element 26, and a third lens element, shown as second negative lens element 28. In other embodiments, the decompression lens 23 includes at least one lens element (e.g., one, two, etc.). According to an example embodiment, the first negative lens element 24 has at least one high order aspheric surface. The high order aspheric surface(s) of the first negative lens element 24 may be structured to have a negative optical power, expand bundles of rays, and partially correct field aberrations. In one embodiment, the focal length of the first negative lens element 24 is minus 5.6 mm. In other embodiments, the focal length of the first negative lens element 24 is at least one of greater, lesser, and positive. According to an example embodiment, the positive lens element 26 has high order aspheric surfaces with a relatively strong positive optical power. The high order aspheric surfaces of the positive lens element 26 may be structured to converge bundles of rays and partially correct field aberrations. In one embodiment, the focal length of the positive lens element 26 is positive 3.9 mm. In other embodiments, the focal length of the positive lens element 26 is at least one of greater, lesser, and negative. According to an example embodiment, the second negative lens element 28 has high order aspheric surfaces. Due to the second negative lens element 28 being in such close proximity to the image sensor 32, the aspheric surfaces of the second negative lens element 28 may effectively correct image compression, field curvature, and residual field aberrations through cooperation with the aspheric surfaces of the first negative lens element 24 and the positive lens element 26. In one embodiment, the second negative lens element 28 is structured to have a negative optical power with a focal length of minus 3.2 mm. In other embodiments, the focal length is at least one of greater, lesser, and positive.

The lens element(s) of the decompression lens 23 may be made cost effectively from plastic materials using plastic molding technology. The first negative lens elements 24 and the second negative lens element 28 may be made from high dispersion plastic materials such as at least one of Polystyrene, Polycarbonate, and Rexolite. According to an example embodiment, the Abbe number for the high dispersion plastic materials is approximately 30. In other embodiments, the Abbe number of the high dispersion plastic materials varies (e.g., greater than or less than 30, etc.) based on the application of the optical system 10. The positive lens element 26 and the COE 14 may be made from low dispersion optical plastic materials such as at least one of Acrylic, PMMA and Zeone. According to an example embodiment, the Abbe number of the low dispersion plastic materials is slightly less than 60. In other embodiments, the Abbe number varies (e.g., greater than or less than 60, etc.) based on the application of the optical system 10. Chromatic aberrations (longitudinal and lateral color) may be corrected using these types of optical materials in a wavelength range from blue line 455 nm up to red line 644 nm. It is important to eliminate lateral color in wide-angle optics, which may be done with this specific embodiment (see, e.g., FIG. 14). To further improve color correction, the first surface of the first negative lens element 24 may be coated by a thin film infrared (IR) cut-off filter, which blocks the light starting from wavelength 680 nanometers (nm) approximately and up. Another advantage of the IR filter coating is reducing the number of optical elements needed in the system 10. Without the IR coating, the optical system 10 may otherwise require an additional filter placed in a front of the image sensor 32. In other embodiments, one or more of the lens elements of the decompression lens 23 and/or one or more of the optical surfaces of the COE 14 are made from materials other than plastic materials (e.g., glass, etc.).

According to an example embodiment, the effective focal length of the decompression lens 23 is 6.2 mm. In other embodiments, the focal length is different (i.e., differently structured to receive the virtual curved and compressed image projected by differing catadioptric optical elements) (e.g., longer, shorter, based on the structure of the COE 14, etc.). In other embodiments, the decompression lens 23 is comprised of one or more lens elements having a total of one or more aspheric surfaces (e.g., one lens, two lenses, four lenses, etc.).

As shown in FIG. 1, the hardware aperture 22 is positioned behind the COE 14 and in a front of the decompression lens 23 (i.e., between the COE 14 and the decompression lens 23). In one embodiment, the hardware aperture 22 is positioned at a distance from the COE 14 such that the hardware aperture 22 is located at or in the vicinity of the geometrical focus of the convex reflector 18. According to an example embodiment, the hardware aperture 22 is configured to aid in optical image formation; specifying entrance and exit pupils for the optical system 10 and filtering ray bundles 34 from object points (e.g., filtering out light rays other than those reflected by the convex reflector 18, etc.). According to an example embodiment, the cover glass 30 is configured to protect the surface of the image sensor 32 where a real optical image (e.g., a high resolution decompressed image, etc.) is formed. In one embodiment, the image sensor 32 is a flat (i.e., two-dimensional (2D)) sensing surface. In other embodiments, the image sensor 32 is curved (i.e., three-dimensional (3D)) (see, e.g., FIG. 31). The process in which a high resolution decompressed image is formed onto the image sensor 32 is described more fully herein.

According to an example embodiment, the total length of the optical system 10 is 60 mm. In other embodiments, the total length of the optical system 10 increases or decreases based on the selection of the structure and dimensional qualities (e.g., focal length, diameter, etc.) of the COE 14 and/or the decompression lens 23. The effective vertical field of view (EVFOV) of the optical system 10, according to an example embodiment, is 70 degrees: 15 degrees up from the horizon and 55 degrees down from the horizon. In other embodiments, the EVFOV ranges between 70 and 90 degrees with a variety of possibilities for degrees up from the horizon and degrees down from the horizon (e.g., EVFOV of 80: 30 degrees up and 50 degrees down from the horizon, EVFOV of 80: 40 degrees up and 40 degrees down from the horizon, EVFOV of 85: 45 degrees up and 40 degrees down from the horizon, etc.). In still other embodiments, the EVFOV of the optical system 10 is less than 70 degrees. The horizontal field of view of the optical system 10 may be up to 360 degrees as a result of the axial symmetry of the optical system 10 about the vertical optical axis 12.

Figure 2B:
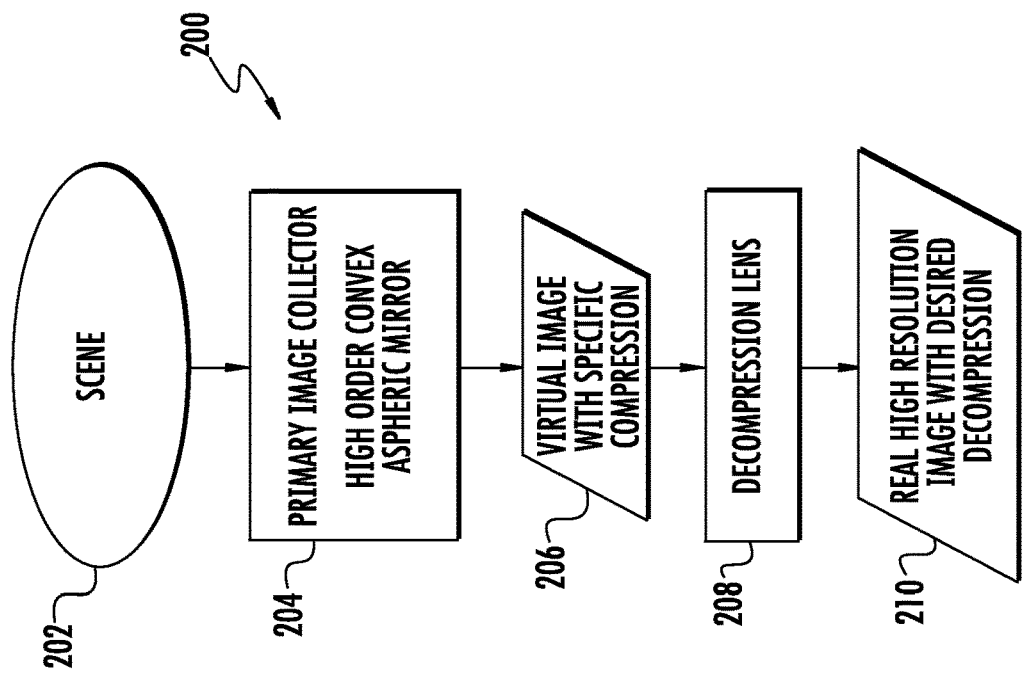
FIGS. 2A and 2B show a schematic and flow chart of a method of image compression and decompression, according to an example embodiment.
Figure 2A:
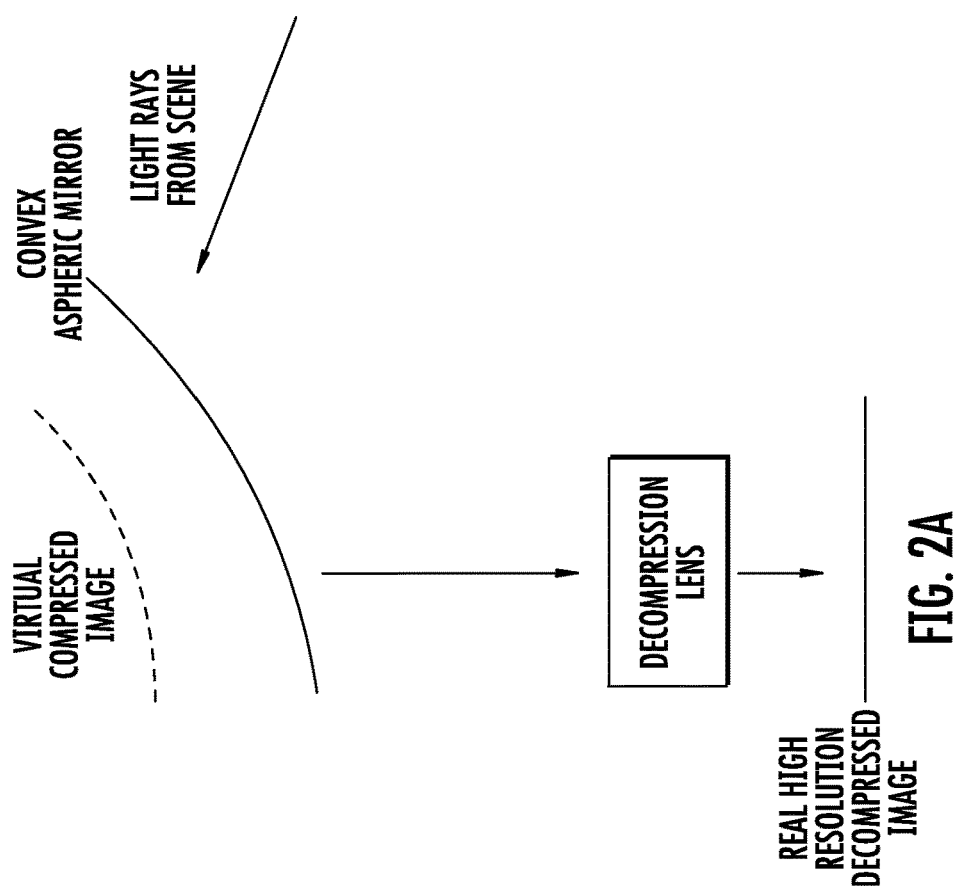

Referring now to FIGS. 2A and 2B, a method 200 to compress and decompress an image with high resolution is shown according to an example embodiment. In one example embodiment, method 200 may be implemented with the optical system 10 of FIG. 1. Accordingly, method 200 may be described in regard to FIG. 1.

At process 202, a scene of interest is chosen. For example, a compact panoramic camera with the optical system 10 may be directed towards attendees and/or a board of a meeting in a conference room for videoconferencing purposes, used as the eye of a robotic apparatus in a robotics competition to aid in the navigation of a course, or any other implementation which may require and/or benefit from a compact panoramic camera with powerful optics and high resolution imaging. At process 204, a primary image collector, such as convex reflector 18 (i.e., a high order convex aspheric mirror) accepts (i.e., receives) light rays from the scene. For example, the ray bundles 34 from object points of the scene mentioned above enter the COE 14 through the first refractive surface 16. The ray bundles 34 refract as they pass through the first refractive surface 16 towards the convex reflector 18. The ray bundles 34 reflect off of the high order aspheric mirrored surface (e.g., a hyperbolic mirrored surface, etc.) of the convex reflector 18 and leave the COE 14 through the second refractive surface 20.

At process 206, a virtual curved and compressed image 19 with a specific compression is created. For example, as the ray bundles 34 reflect off of the convex reflector 18, the virtual curved and compressed image 19 of the object space points of the scene is created behind the convex reflector 18 (e.g., due to the negative focal length as mentioned above, etc.). The virtual curved and compressed image 19 takes on the aspheric compression (e.g., hyperbolic compression, etc.) of the high order convex aspheric surface of the convex reflector 18 (e.g., hyperbolic mirror, etc.). According to an example embodiment, the convex reflector 18 has a hyperbolic structure, and therefore the virtual curved and compressed image 19 is of a hyperbolic compression specific to the hyperbolic structure of the mirror surface of the convex reflector 18. The virtual curved and compressed image 19 is formed along a curved surface (e.g., hyperbolic, parabolic, etc.). Field curvature correction or elimination to generate an image on a flat surface is a substantially important task in getting high resolution sharp optical images on the image sensor 32. In other embodiments, the compression of the virtual curved and compressed image 19 is different depending on the shape of the surface of the convex reflector 18 (e.g., spherical, parabolic, high order aspheric, etc.). For example, if the convex reflector 18 surface is parabolic in structure, the virtual curved and compressed image 19 may have parabolic compression and its surface curvature may be two times more than the surface curvature of the convex reflector 18.

At process 208, the decompression lens 23 receives the ray bundles 34 which left the COE 14 through the second refractive surface 20, as mentioned above. The virtual curved and compressed image 19 is projected through hardware aperture 22 where it is filtered and relayed to the decompression lens 23. The virtual curved and compressed image 19 plays the role of the object (i.e., the scene) for the decompression lens 23. The specifically structured aspheric lens elements 24, 26, and 28 sharply project the above mentioned image onto the image sensor 32 with high optical resolution and desired decompression (process 210). According to the example embodiment, the decompression lens 23 receives the virtual curved and compressed image 19 with hyperbolic compression and projects the image with high resolution and parabolic decompression onto the image sensor 32. In other embodiments, the decompression lens 23 receive a differently shaped aspheric compressed image (e.g., parabolic, etc.) and projects an image with high resolution and desired decompression (e.g., parabolic, hyperbolic, etc.) onto the image sensor 32. According to an example embodiment, the method for compressing and decompressing the light ray bundles is done by optic means with the optical system 10 without digital image processing (i.e., mechanically, etc.). In alternative embodiments, digital image processing may be used.

Referring to FIG. 3, a prior art optics of an ideal catadioptric optics system 100 is shown with the convex reflector 18 structured as a convex parabolic mirror. The ideal catadioptric optics system 100 also includes an ideal telecentric lens 27, a camera lens 29, and a curved image sensor 33. The telecentric lens 27 is needed when using a pure parabolic mirror. Working together, the telecentric lens 27 and the camera lens 29 create a real curved image of the ray bundles 34 from the object space points. The telecentric lens 27 and the camera lens 29 achieve this by projecting the virtual curved and compressed image 19 (not shown in FIG.

3) created by the parabolic convex reflector 18 with some magnification onto the curved image sensor 33. The magnification is equal to some relationship of the focal length of telecentric lens 27 and the camera lens 29. The virtual image diameter is equal to diameter of the parabolic convex reflector 18. In one embodiment, the magnification is less than 1.0 because the focal length of the telecentric lens 27 is more than the focal length of the camera lens 29. The smaller the magnification, the smaller the diameter of the image on the curved image sensor 33 relative to the virtual image diameter. Lower magnification on camera lens 29 enables simpler lens design for field flattening. This results in a higher number for the ratio of the diameter of convex reflector 18 to the diameter of the curved image sensor 33. If the magnification is less than 4.5, it is very difficult, if not impossible, to get a high resolution sharp flat image surface.

When appropriately designed, catadioptric systems (e.g., mirror and lens based systems), like that of FIG. 3, offer the best method of single-sensor wide angle persistent imaging. A wide range of field compression functions are possible with this method. The field compression introduced in capture may be fully reversed computationally in the resulting image. The use of mirrors as the primary field compression agents in these systems causes the subsequent refractive elements to have dramatically smaller sizes (i.e., by orders of magnitude in some cases). It is also true for the ideal catadioptric optics system 100 only if the telecentric lens 27 be replaced by a mirror. In this case, the single mirror optics 100 may be converted in dual-mirror optics. This may be a distinct advantage when at least one of weight and material cost may be considerations.

Referring to FIG. 4, a graph of the panoramic field curvature 400 and a graph of the f-theta distortion/image compression 402 with the convex reflector 18 structured as a parabolic mirror, an ideal telecentric lens 27, and an ideal camera lens 29 for the system of FIG. 3 are shown. When used with a flat image sensor, such as the image sensor 32, as opposed to the ideal curved image sensor 33, the field curvature becomes a significant issue (see, e.g., FIG. 6) that needs to be corrected to achieve the flat field shown in the graph of the panoramic field curvature 400. The system has the benefit of 20.7% decompression from the center to the edge of the mirror. In other embodiments, the parabolic mirror systems are capable of providing even higher decompression ranging from 23% up to 25%. This may be desirable as the edge of the mirror covers the most pixels and hence results in higher digital resolution of the resultant image.

Implementing systems with field curvature correction using primary parabolic mirrors and obtaining the desirable field compression properties have been done for years. However, challenges remain in delivering systems that are both very high in resolution and simultaneously small and compact. Market demands call for systems incorporating this dichotomy of small size and high resolution. Systems may be implemented which employ sophisticated methods to eliminate third and higher order aberrations including astigmatism, field curvature and milder versions of coma. This may be achieved by using techniques such as building confocal systems to eliminate astigmatism and spherical aberration in pupils, and using the second and higher order aspheric optical surfaces of the mirrors and lens elements to suppress the coma and higher order field aberrations. However, as the overall linear size of the system approaches the sensor linear size, higher order aberrations begin to play a greater role and below certain scale ratios, these aberrations remain uncorrected and detectable by sensor pixels, rendering images unusable, and placing lower limits on the ratio between system and sensor sizes. The use of hyperbolic and other primary mirror shapes may be used to address the above challenges. This idea is discussed more fully herein and an example of the field compression using a hyperbolic primary mirror may be seen in FIGS. 5-6.

Figure 5:
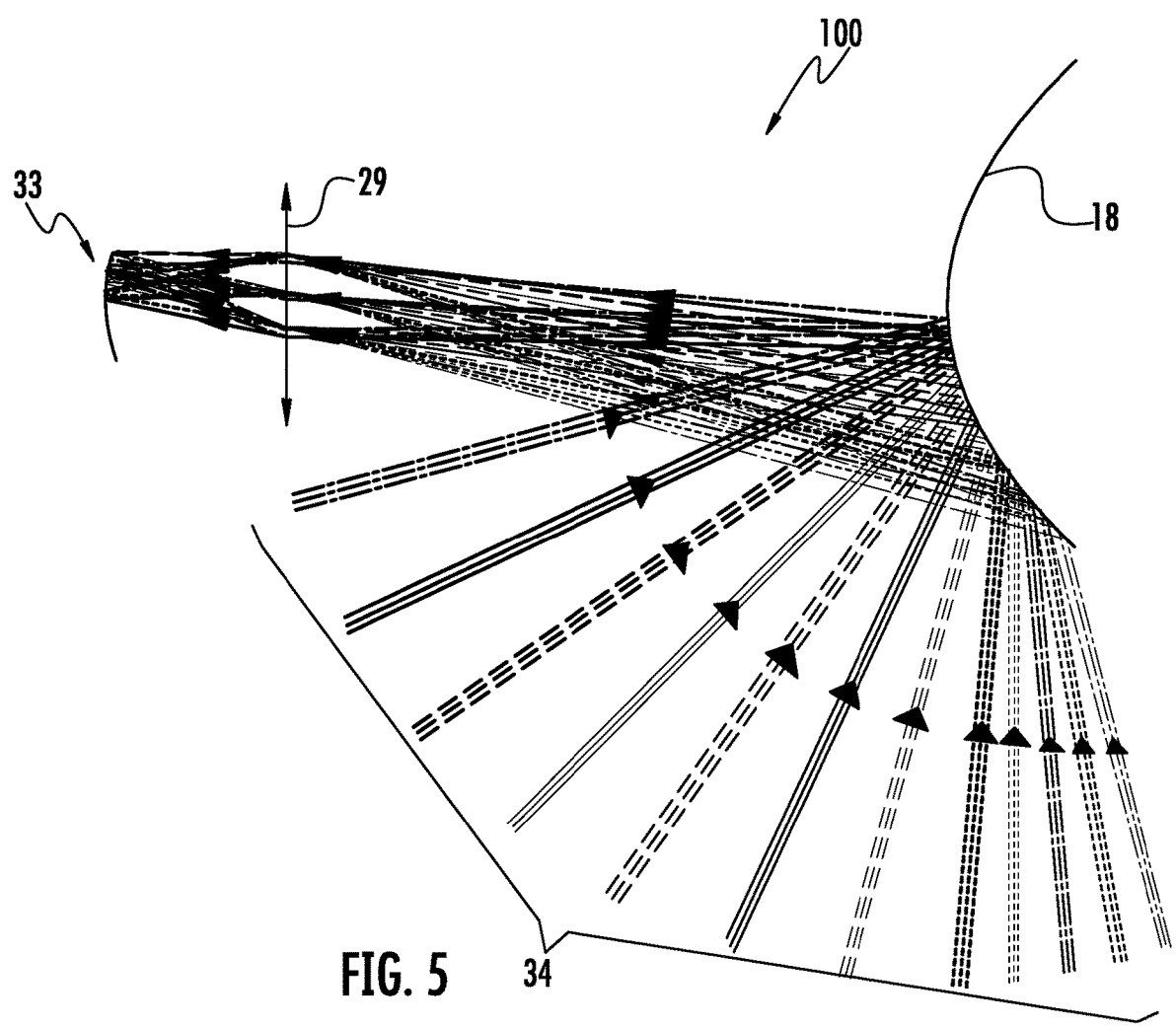
FIG. 5 is a convex hyperbolic mirror with an ideal lens of the ideal catadioptric optics.

Referring to FIG. 5, a hyperbolic convex reflector 18 with an ideal camera lens 29 of the ideal catadioptric optics system 100 is shown. The ideal camera lens 29 creates a real curved and decompressed image of the ray bundles 34 of the object space points by projecting the virtual curved and compressed image 19 (not shown in FIG. 5) created by the hyperbolic structured convex reflector 18 with some demagnification onto the curved image sensor 33. It is the same type of optical system as shown in FIG. 1 with replacement of the decompression lens 23 with the ideal camera lens 29. This example embodiment is shown for comparison of image decompression capabilities between the decompression lens 23 and the ideal camera lens 29.

Figure 6:
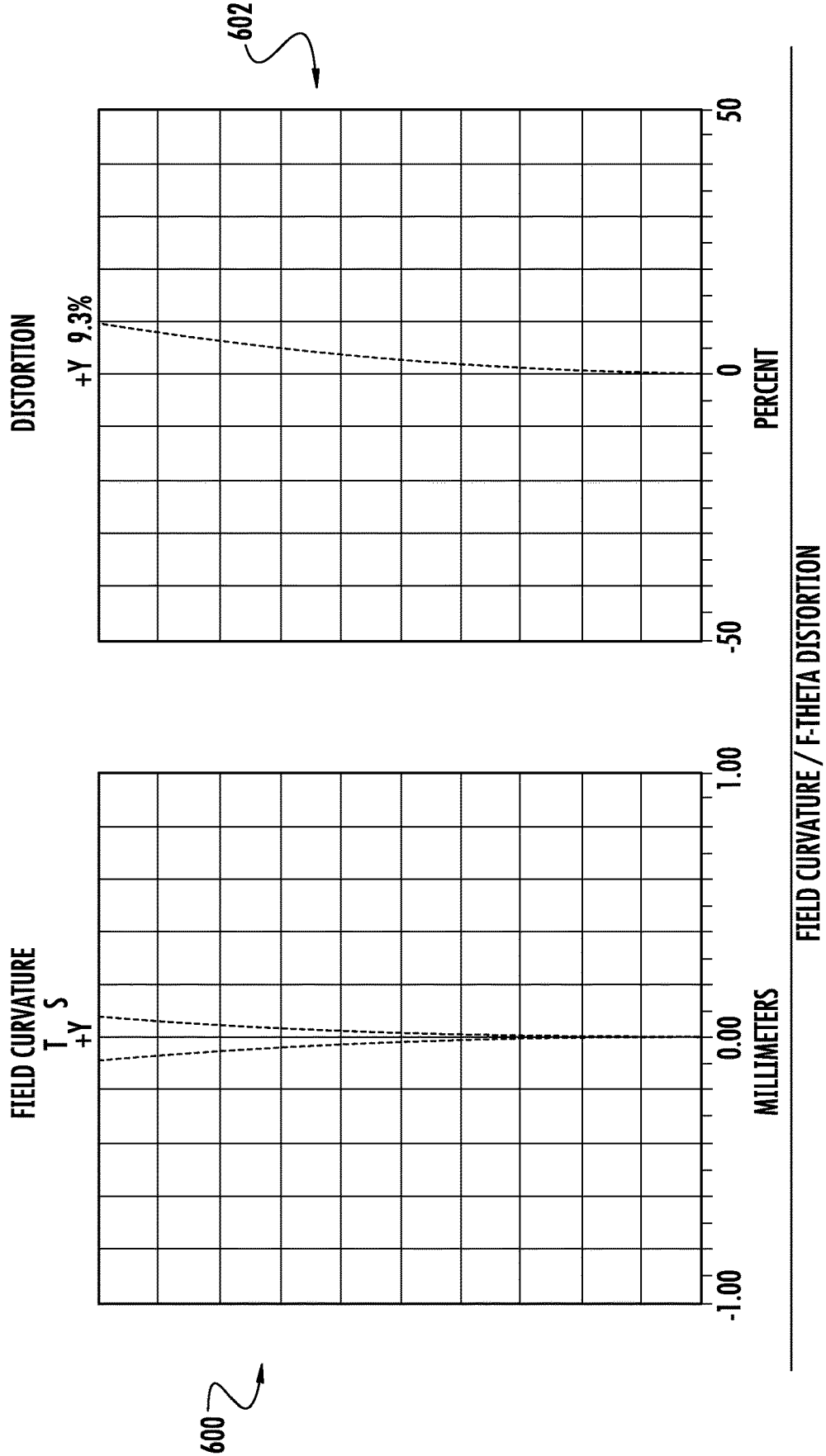
FIG. 6 is a depiction of field curvature and distortion graphs for the arrangement of FIG. 5.

Referring now to FIG. 6, a graph of the panoramic field curvature 600 and a graph of the f-theta distortion/image compression 602 with the convex reflector 18 structured as a hyperbolic mirror together with the ideal camera lens 29 (layout shown in FIG. 5) are shown. The field compression advantage over a fish eye lens does not meet desired performance characteristics when using this mirror profile together with the ideal lens 29. Therefore, to achieve the high performance characteristics of the parabolic mirror based optics system with a hyperbolic mirror based optics system (shown in FIGS. 1 and 5), the ideal lens 29 (in FIGS. 3 and 5) is replaced with the inventive decompression lens 23 of FIG. 1, which is described more fully herein.

Figure 7:
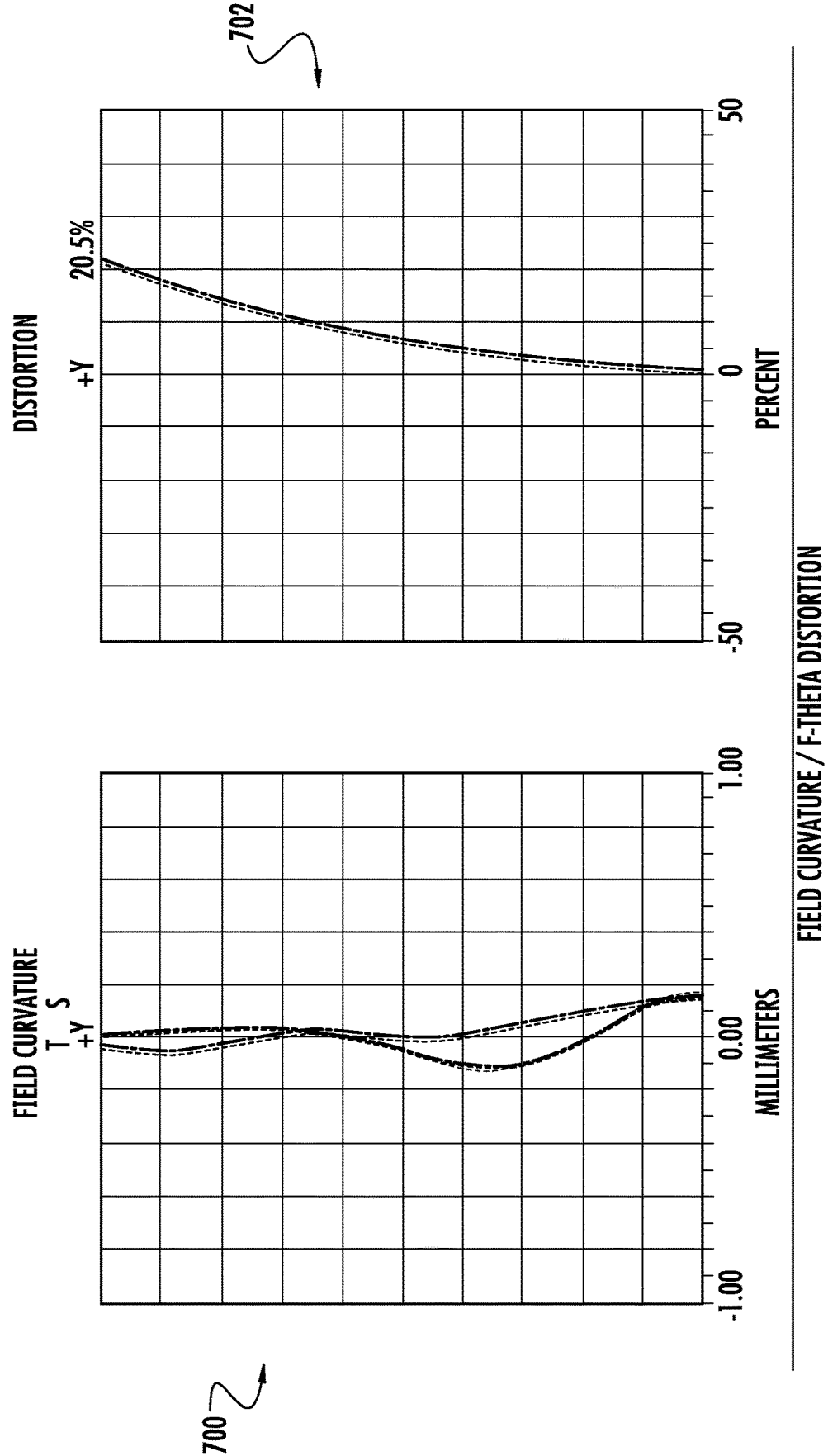
FIG. 7 is a depiction of field curvature and distortion graphs for the arrangement of FIG. 1, according to an example embodiment.

Referring now to FIG. 7, a graph of the panoramic field curvature 700 and a graph of the f-theta distortion/image compression 702 for the optical system 10 of FIG. 1 are shown. To achieve the promise of a compact high resolution wide angle catadioptric optical system, the following features are desirable: a compact aspheric primary mirror, flat field (i.e., low field curvature), and parabolic field compression. The optical system 10 uses the same compact, aspheric, non-parabolic primary mirror of FIG. 5 used to generate the results in FIG. 6 (i.e., a hyperbolic structured convex reflector 18). However, the ideal lens 29 and the ideal curved image sensor 33 of FIG. 5 are replaced with the decompression lens 23 and the flat image senor 32 of FIG. 1. The novel decompression lens 23 modifies the field compression function to achieve near parabolic field compression in the resultant image (without using a parabolic mirror).

The field compression characteristic of 20.5% decompression from the center to the edge of the mirror is relatively close to the field compression characteristic of the ideal parabolic mirror based system (20.7% decompression) shown in FIG. 4. This results in a high resolution system that mimics the behavior of the parabolic mirror based systems without foregoing the small and compact size consideration. To achieve this objective, the shape of the virtual curved and compressed image 19 generated by the primary aspheric mirror, the convex reflector 18, may be analyzed and a field curvature corrector and decompression profile may be generated to design the decompression lens 23 as shown in FIG. 1. The lens includes geometries configured to provide field curvature correction, aspheric to parabolic compression conversion, low optic F-stop, and a compact form factor. The combination of the specific optical parameters of the COE 14 and the lens elements 24, 26, 28, their positioning, and materials allows the optical system 10 to achieve high optical resolution on the flat image sensor 32 for the visible spectrum of light with F-stop 2.6 in image space. In other embodiments, the above characteristics may vary, resulting in different F-stop numbers (e.g., 2.7, 2.8, 2.9, etc.). In various embodiments, the ratio of the convex reflector diameter to the image diameter may range from approximately 6.5:1 to 2.3:1.

Figure 8:
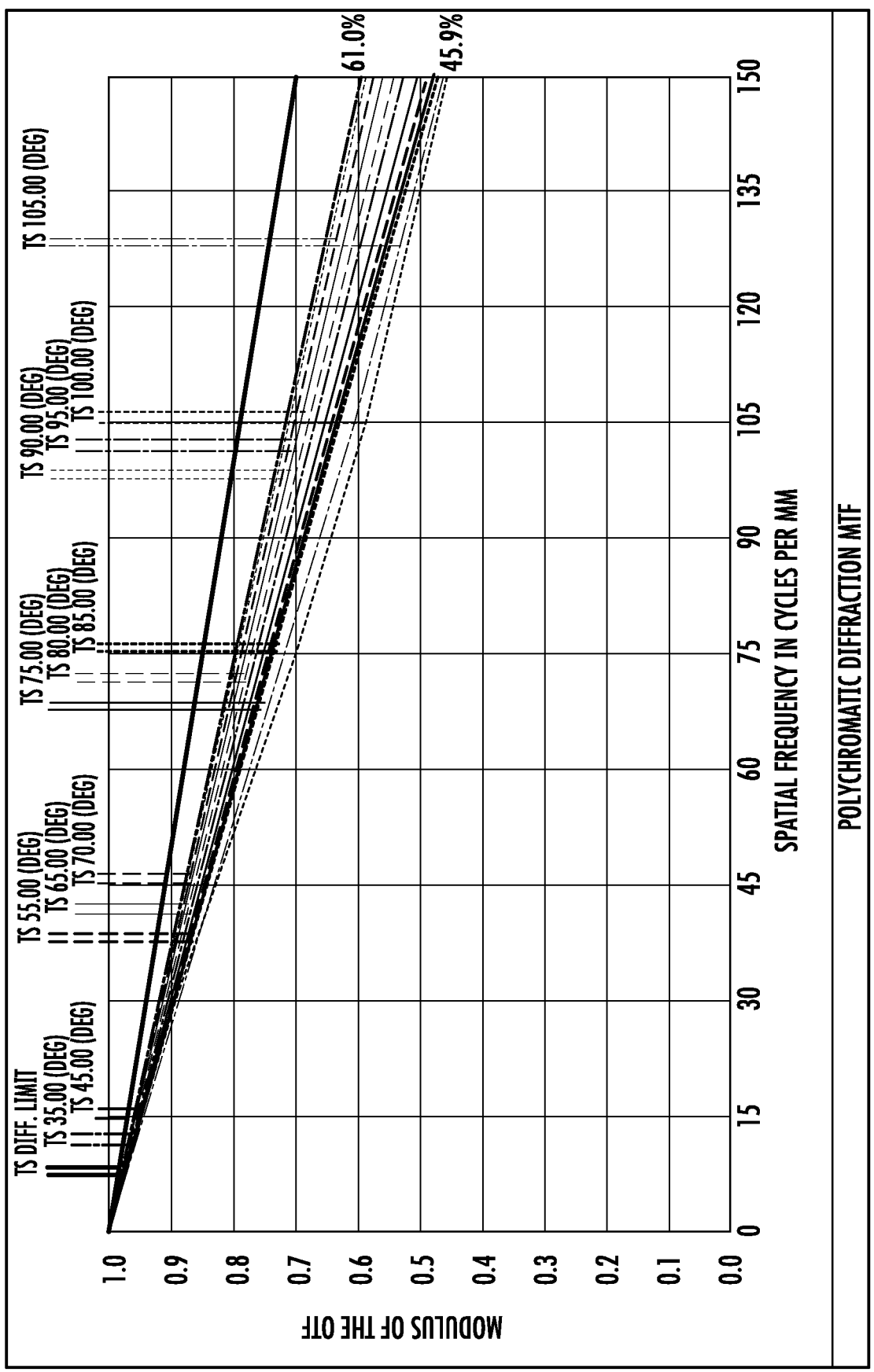
FIG. 8 is a graph of polychromatic diffraction MTF for twelve vertical view points for the arrangement of FIG. 1, according to an example embodiment.

Referring to FIG. 8, a graph of the polychromatic diffraction modulation transfer functions (MTF) for twelve vertical view points of the compact panoramic camera optical system 10 as compared with a diffraction limited MTF (black curve) are shown according to an example embodiment. As can be seen from the graph, the panoramic imaging system provides resolution of 150 line pairs per millimeter with image contrast (MTF) in a range from 45.9% up to 61.0% across vertical field of view from 35 degrees up to 105 degrees counting up from the vertical optical axis 12.

Figure 9:
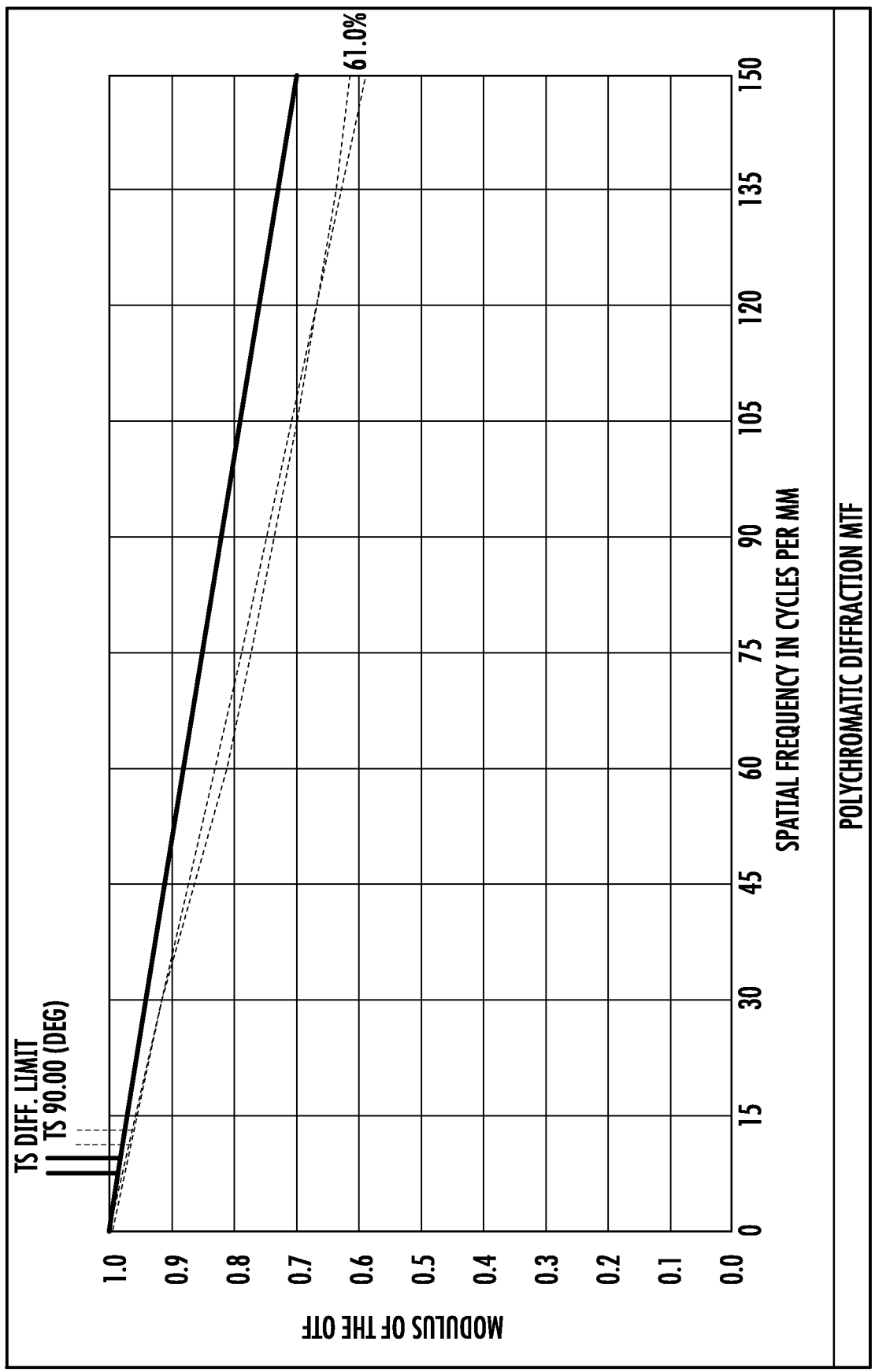
FIG. 9 is a graph of polychromatic diffraction MTF for horizon points for the arrangement of FIG. 1, according to an example embodiment.

Referring to FIG. 9, the tangential and sagittal graphs of the modulation transfer function (MTF) for horizon points of the compact panoramic camera optical system 10 as compared with a diffraction limited MTF (black curve) for polychromatic light are shown according to an example embodiment. As can be seen from the graphs, the panoramic imaging system provides resolution of 150 line pairs per millimeter with contrast (MTF) about 61.0%. The real limited resolution for the horizon is much higher, specifically 300 cy/mm if the minimum image contrast of 30% is accepted.

Figure 10:
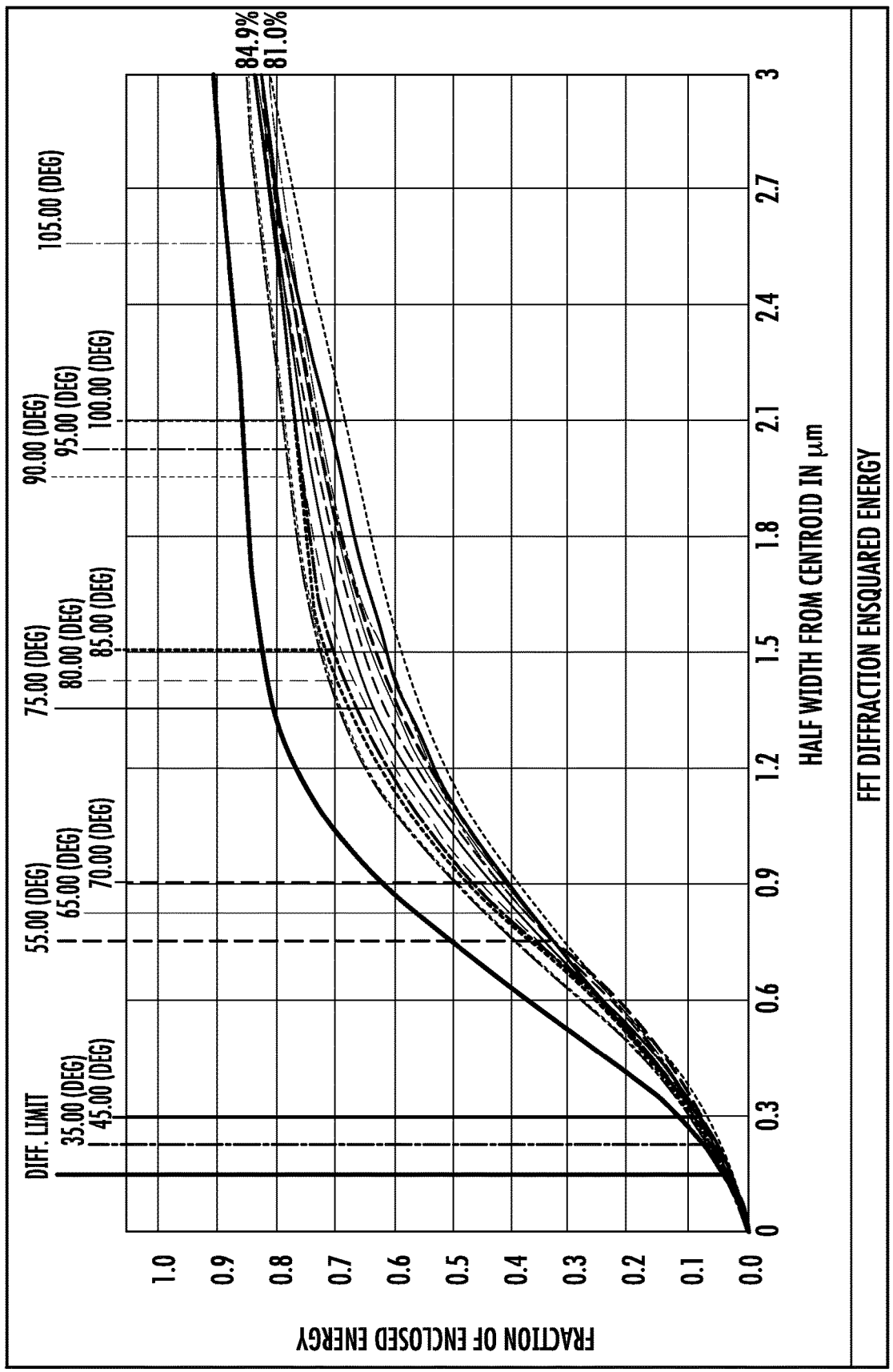
FIG. 10 is a graph of diffraction ensquared energy for the arrangement of FIG. 1, according to an example embodiment.

Referring to FIG. 10, a graph of diffraction ensquared energy (DEE) concentration for twelve vertical view points of the compact panoramic camera system 10 as compared with a diffraction limited DEE (top curve) are shown according to an example embodiment. The DEE graph illustrates the relative amount of the total light energy collected by a square area 2a by 2a on an image plane from a single object point across the field view, where "a" is a distance in microns from the square center as its marked along the horizontal axis of the graph. The vertical axis indicates a fraction of the ensquared energy. The light energy distribution on an image plane from an object point is described by its point spread function (PSF). The DEE concentration is a PSF integration across the square area 2a×2a when the square center point coincides with the maximum PSF point (centroid point). It is desirable to have two-thirds or about 70% DEE concentration in a pixel area to match the optical and digital resolutions.

Figure 11:
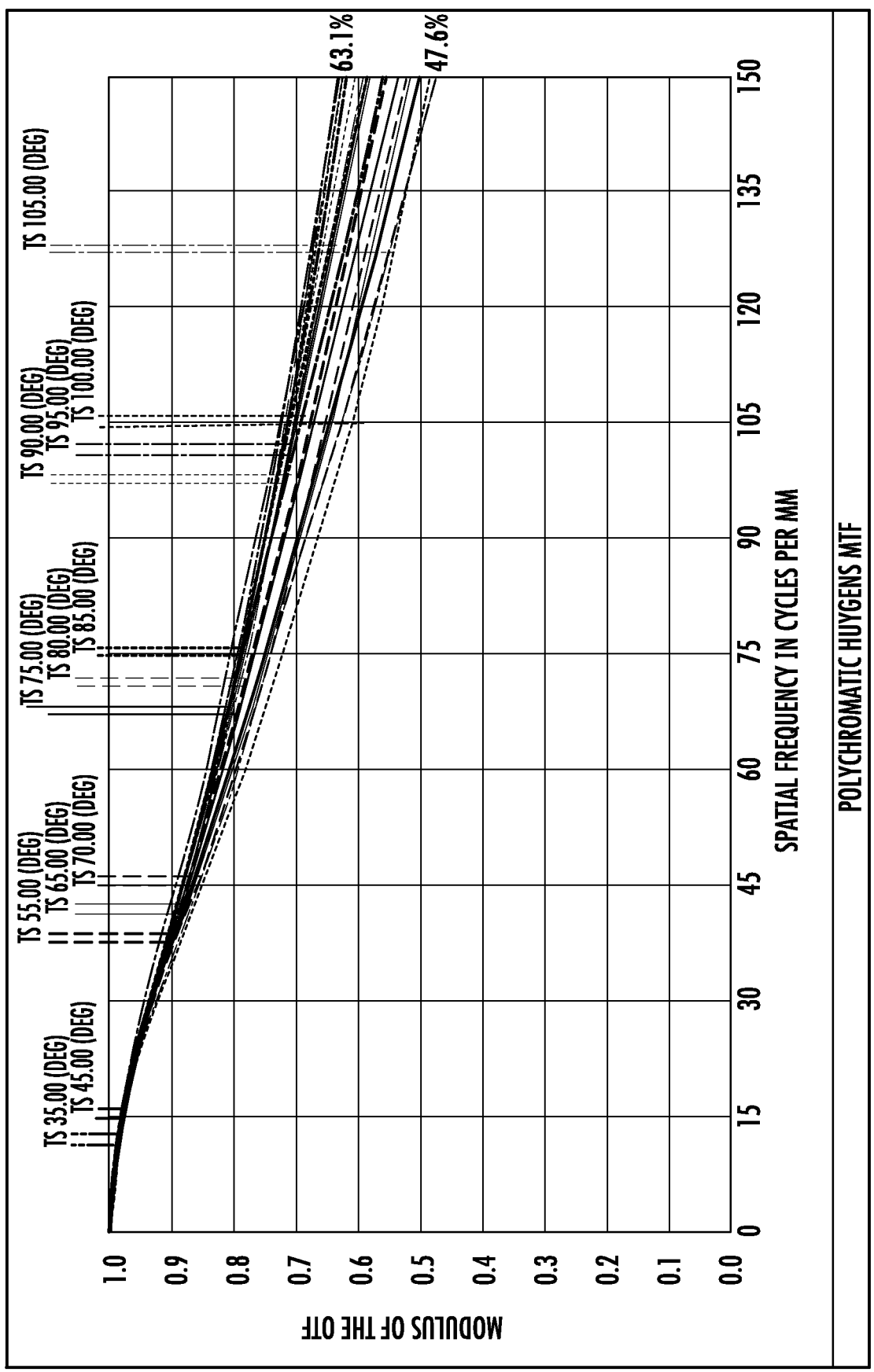
FIG. 11 is a graph of polychromatic Huygens MTF for twelve vertical view points for the arrangement of FIG. 1, according to an example embodiment.

Referring to FIG. 11, a graph of polychromatic Huygens MTF for twelve vertical viewpoints of the compact panoramic camera system 10 is shown according to an example embodiment. The range of the image contrast here is slightly higher than the MTF data in FIG. 8, which may be calculated with some approximation by using the fast Fourier transform.

Figure 12:
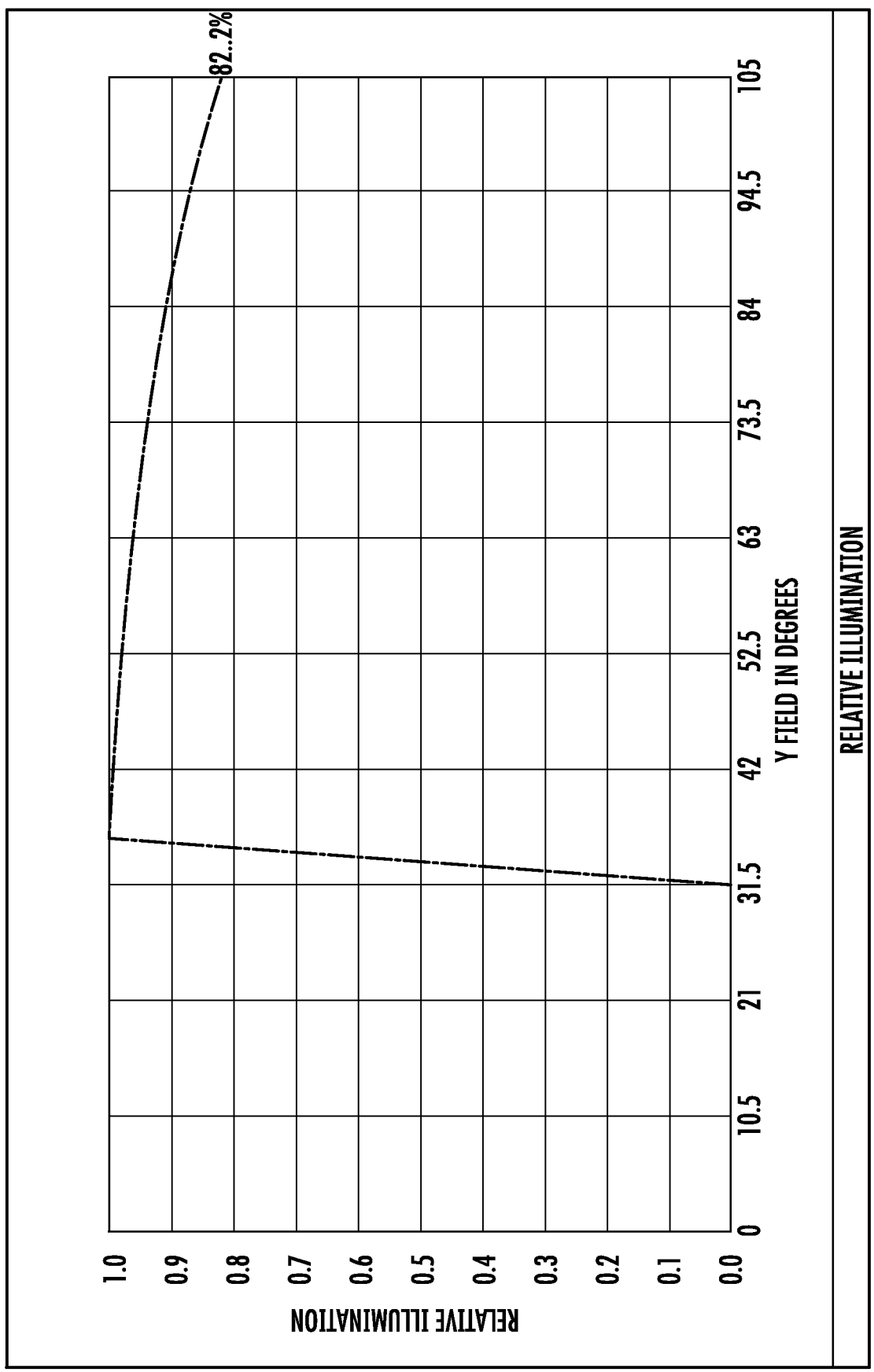
FIG. 12 is a graph of the relative illumination across the vertical field of view for the arrangement of FIG. 1, according to an example embodiment.

Referring to FIG. 12, a graph of the relative illumination across the vertical field of view of the compact panoramic camera optical system 10 is shown according to an example embodiment. This graph demonstrates uniformity of the light distribution on the image sensor 32 across the vertical field of view of the compact panoramic camera. The illumination variation is less than 18% across the entire view.

Figure 13:
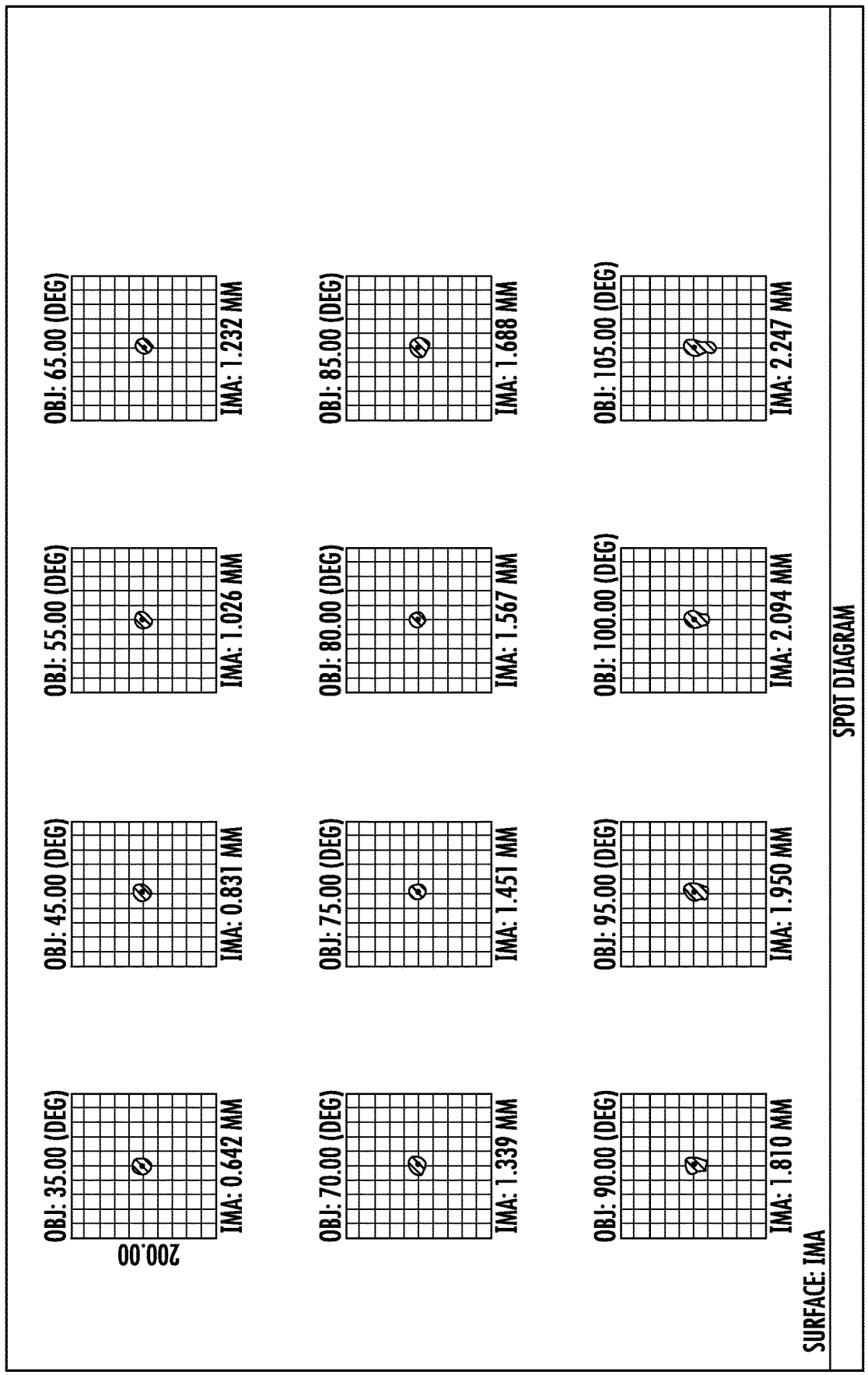
FIG. 13 is shows an image spot diagram for twelve vertical view points for the arrangement of FIG. 1, according to an example embodiment.

Referring now to FIG. 13, image spot diagrams for twelve vertical view points for the arrangement of FIG. 1 are shown according to an example embodiment. As is shown, there is very minimal distortion on the image sensor 32 as the vertical angle increases through the 105 degrees.

Figure 14:
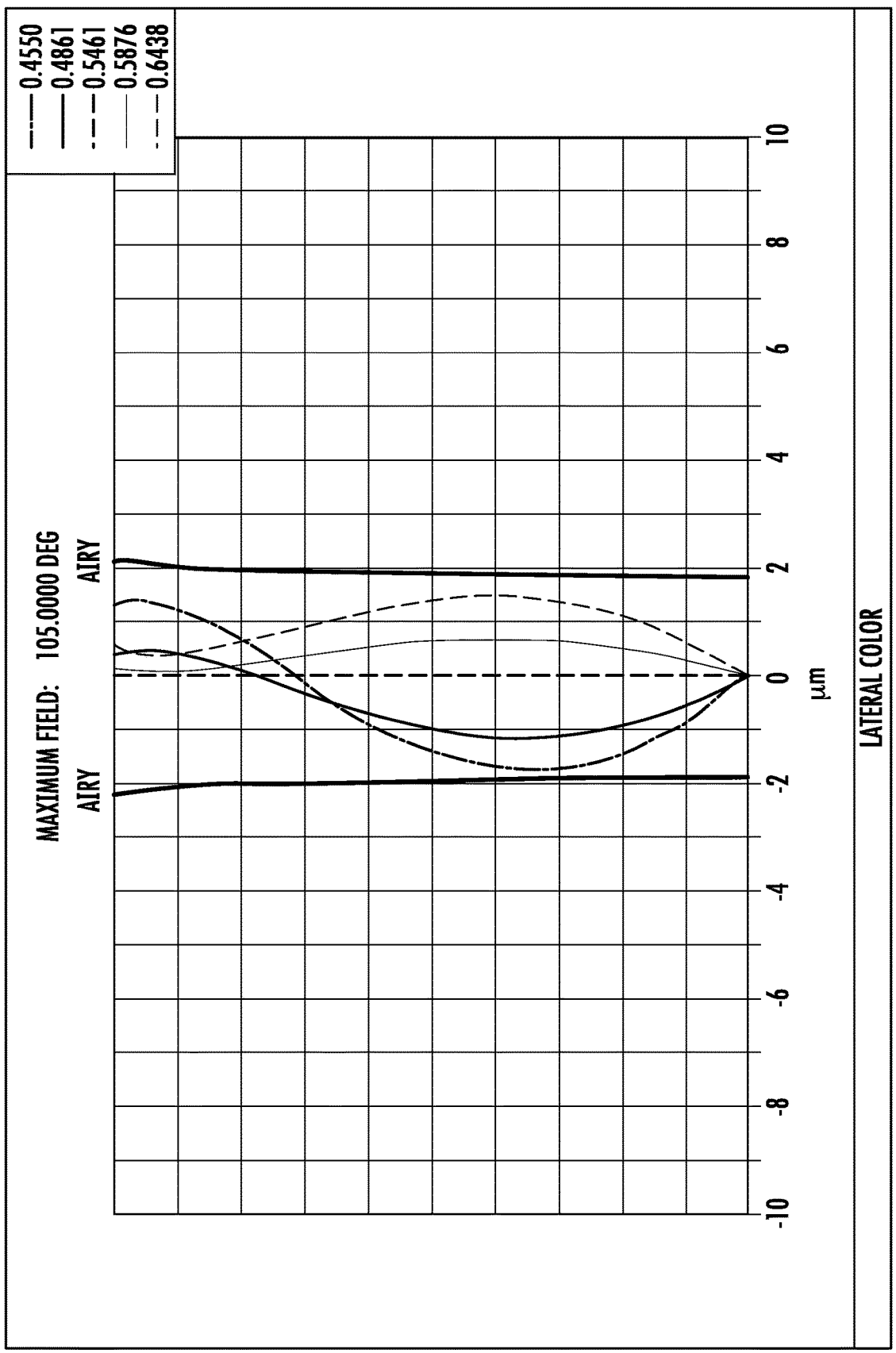
FIG. 14 is shows a lateral color graphs for the arrangement of FIG. 1, according to an example embodiment.

FIG. 14 shows the lateral color graphs for wavelength range from 0.455 microns up to 0.644 microns and their deviations across entire vertical view from the main color wavelength 0.546 microns. The deviations as it may be seen are less than 2 microns and no more than Airy limits.

Figure 15:
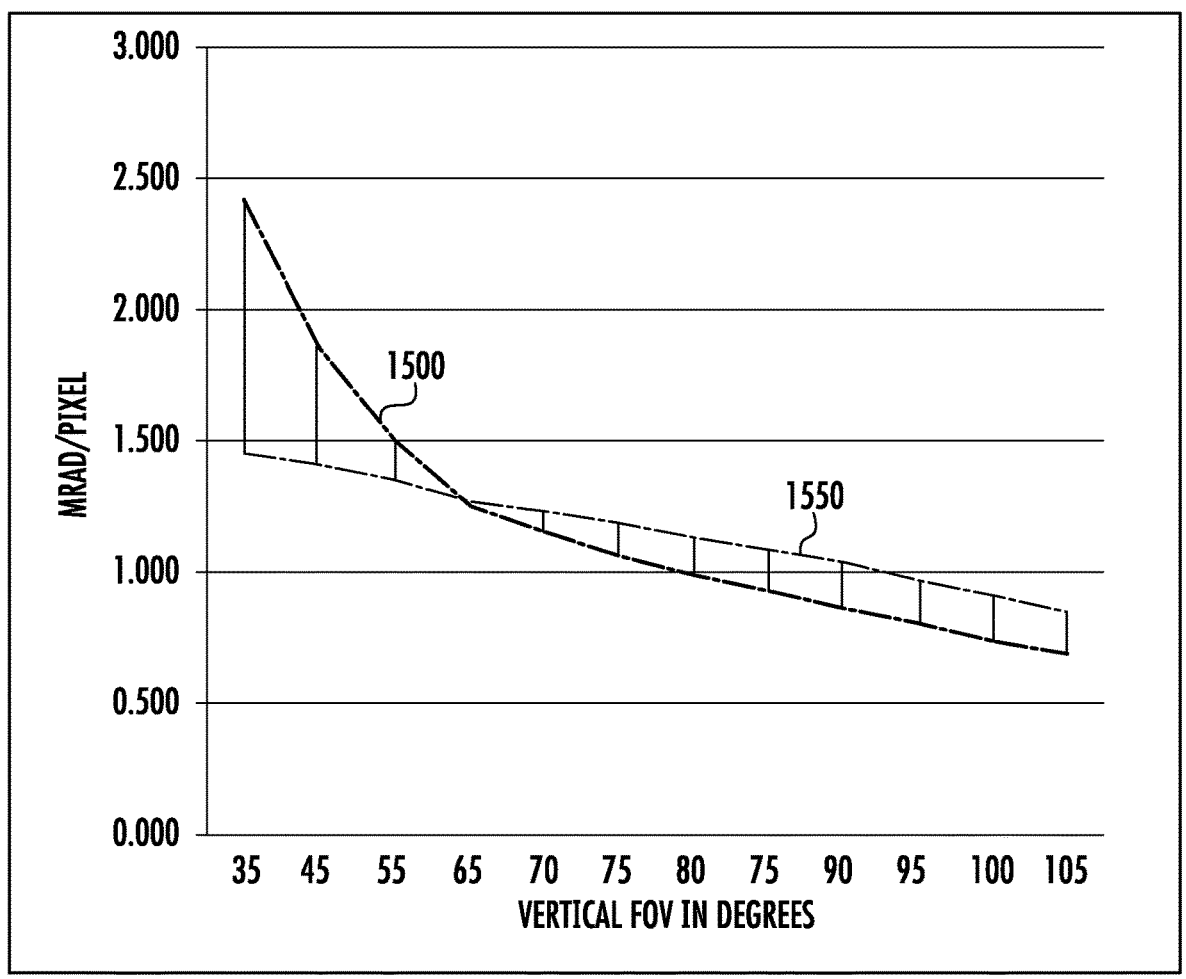
FIG. 15 is shows an instantaneous field of view (IVOF) graphs for the arrangement of FIG. 1, according to an example embodiment.

Referring to FIG. 15, the graphs of the instantaneous field of view in vertical (1550) and horizontal (1500) direction in milli-radians per pixel. They characterize the digital resolution of the compact panoramic camera across entire field of view in both directions in suggestion of using digital sensor with pixel pitch 1.5 microns. For example, the vertical resolution varies from 1.4 mrad/pixel down to 0.8 mrad/pixel if the vertical angle from optical axis varies from 35 degrees up to 105 degrees. The smaller number means the higher resolution.

Figure 16:
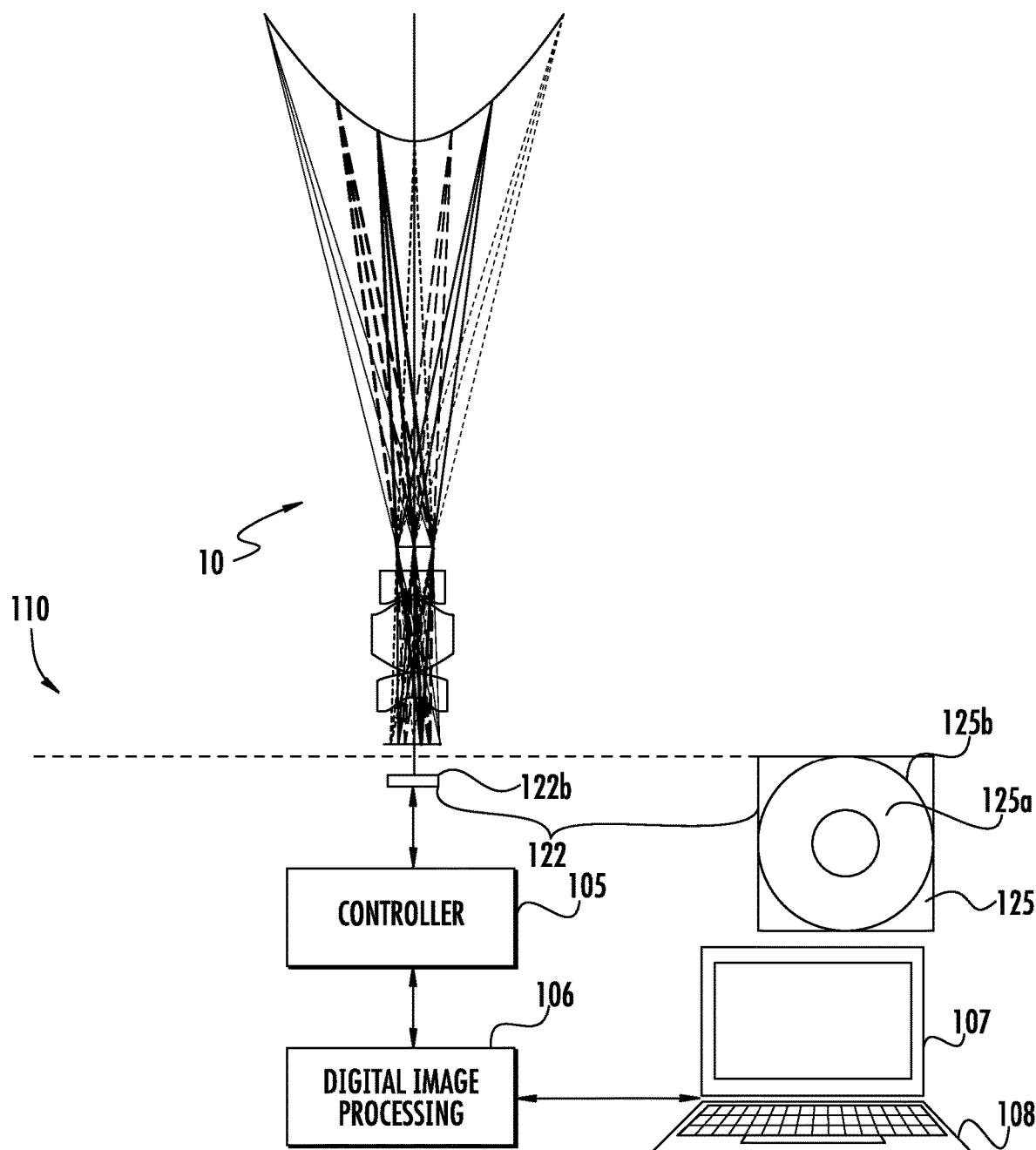
FIG. 16 shows a system block diagram of a panoramic camera, according to an example embodiment.

Referring now to FIG. 16, a system block diagram of a panoramic camera 110 is shown according to an example embodiment. The panoramic camera 110 includes multiple subassemblies. A first subassembly is the optical system 10 (shown in FIG. 1). A second subassembly includes a digital image sensor 122, mounted with respect to the optical system 10 in such a way that a sensor plane 122b of the digital image sensor 122 coincides with the image sensor 32 of the optical system 10. The optical system 10 produces an image 125 on the digital image sensor 122. In some embodiments, the image is circular. For example, in some embodiments, an annular circular image 125 can be formed between an image inner circle 125a and an image outer circle 125b, as determined by the optical system 10.

A third subsystem includes a controller 105 configured to receive an electronic representation of the image captured by the digital image sensor 122. In some embodiments, image processing software 106 is provided for processing the captured image. A digital representation of the focused image is rendered and displayed to an end user. For example, the rendered focused image can be displayed onto a video display 107 at a user interface 108. The user interface 108 can include user controls allowing a user to manipulate the image processing software 106 for at least one of functions to automatically focus the image 125 and functions to manually focus the image 125. In a preferred embodiment, none of the compression and decompression of the virtual curved and compressed image 19 is performed with digital image processing.

Figure 17:
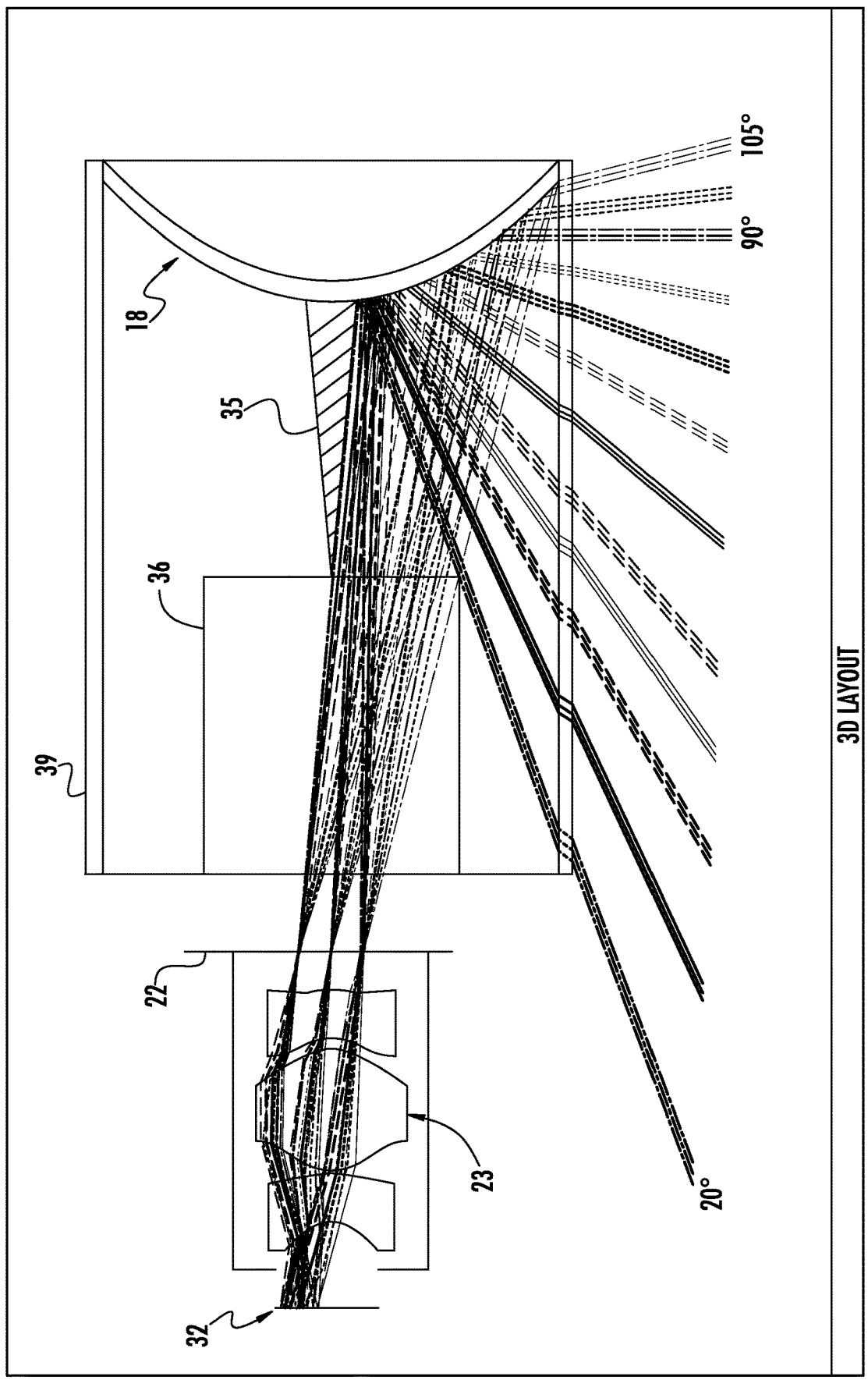
FIG. 17 is an alternative mirror mount by using a cylindrical window, according to another example embodiment.

FIG. 17 shows an alternative optical system layout according to a second example embodiment. The second embodiment is a modification of the first embodiment in that the convex reflector 18 is mounted using a cylindrical window 39. Interior to the cylindrical window 39 is the convex reflector 18, a spike 35, and a baffle 36. The convex reflector 18 may be of hyperbolic structure with a diameter of 20.1 mm and the image sensor 32 may have a diameter of 4.6 mm. Thus the convex reflector to image sensor ratio may be 4.4:1. The spike 35 may be disposed along the vertical optical axis 12 and extend at least partially into the interior of the baffle 36. The spike 35 provides improved stability of the overall optic and reduces unwanted glare in images reflected to the camera. The baffle 36 is a mechanical system, whose function is to shield the light coming from sources outside the field of view (FOV) of the compact panoramic camera.

Figure 18:
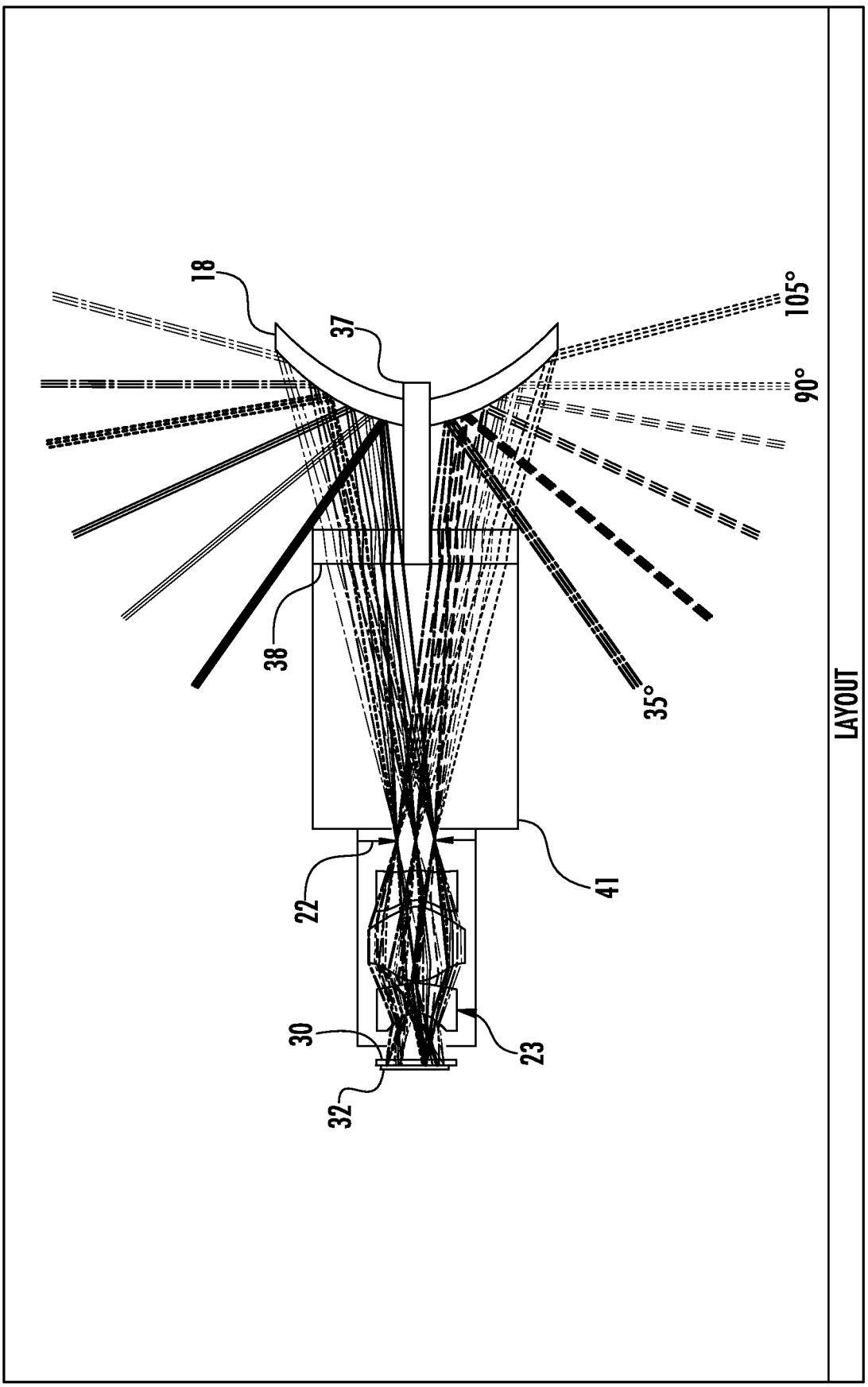
FIG. 18 is an alternative mirror mount by using a central strut and an acrylic plate, according to a third example embodiment.

FIG. 18 shows an alternative optical system layout according to a third example embodiment. The third embodiment is a modification of the first embodiment in that the convex reflector 18 is mounted by using a central strut 37, an acrylic plate 38, and a housing 41. The convex reflector 18 has a diameter of 21.2 mm and the image sensor 32 has a diameter of 4.5 mm. Thus the convex reflector to image sensor ratio is 4.7:1. The central strut 37 acts as a support for the convex reflector 18. The acrylic plate 38 supports the central strut 37, as well as provides a clear passage for light to pass through into the housing 41.

Figure 19:
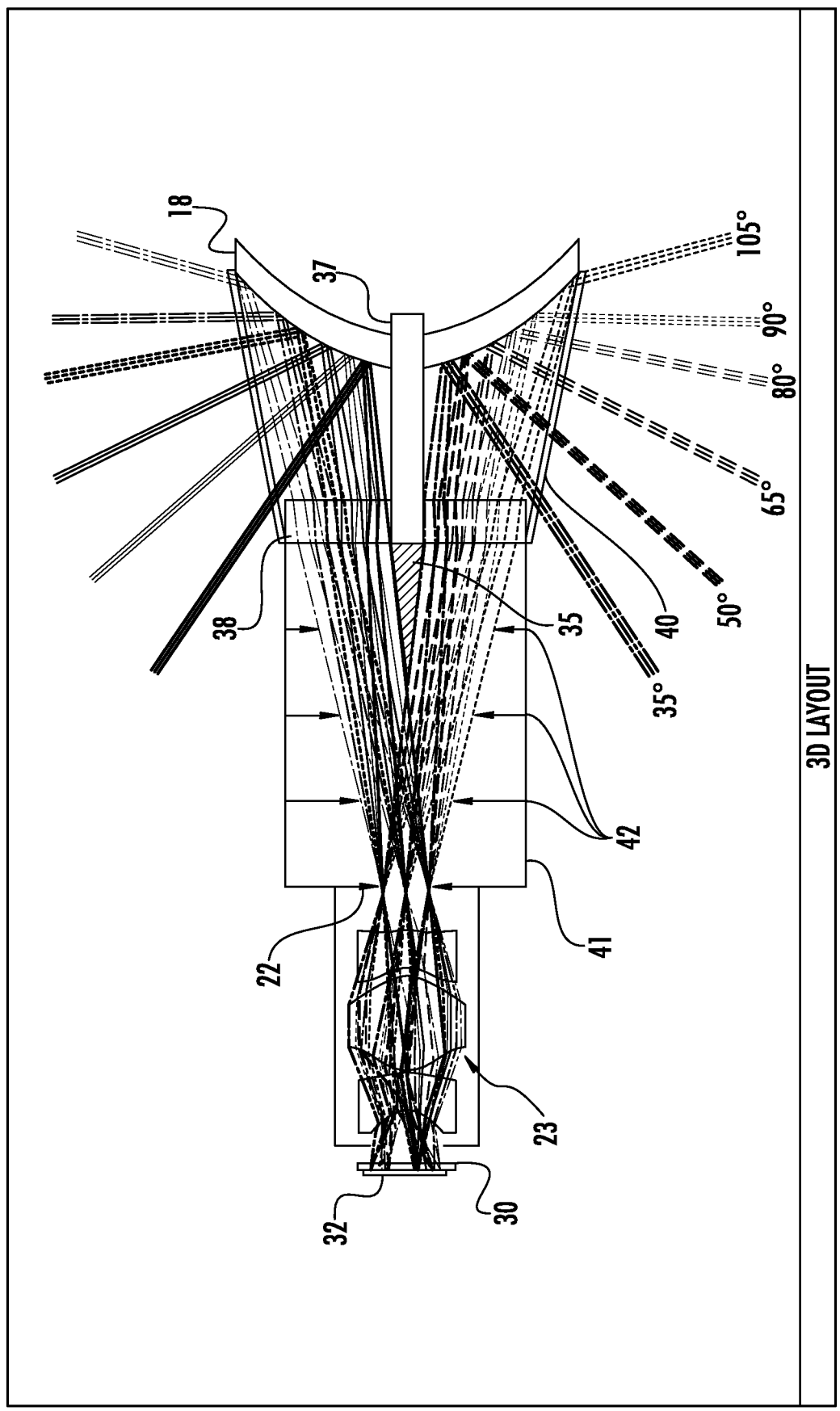
FIG. 19 is an alternative mirror mount by using a central strut and an acrylic plate protected by an acrylic truncated cone window, according to a fourth example embodiment.

FIG. 19 shows an alternative optical system layout according to a fourth example embodiment. The fourth embodiment is a modification of the first embodiment in that the convex reflector 18 is mounted by using a central strut 37, an acrylic plate 38, an acrylic cone window 40, a housing 41, and a light trap diaphragm 42. The convex reflector 18 has a diameter of 21.2 mm and the image sensor 32 has a diameter of 4.5 mm. Thus the convex reflector to image sensor ratio is 4.7:1. The central strut 37 acts as a support for the convex reflector 18. The acrylic plate 38 supports the central strut 37 as well as provides a clear passage for light to pass through into the housing 41. The acrylic cone window 40 acts as a refractive surface as the light travels through it, as well as adds support to the mounting of the convex reflector 18. The housing 41 is used to contain the light trap diaphragm 42. The light trap diaphragm 42 is a tapered annular diaphragm (i.e., contains a conical cutout) which stops the passage of light, except for the light passing through the hardware aperture 22.

Figure 20:
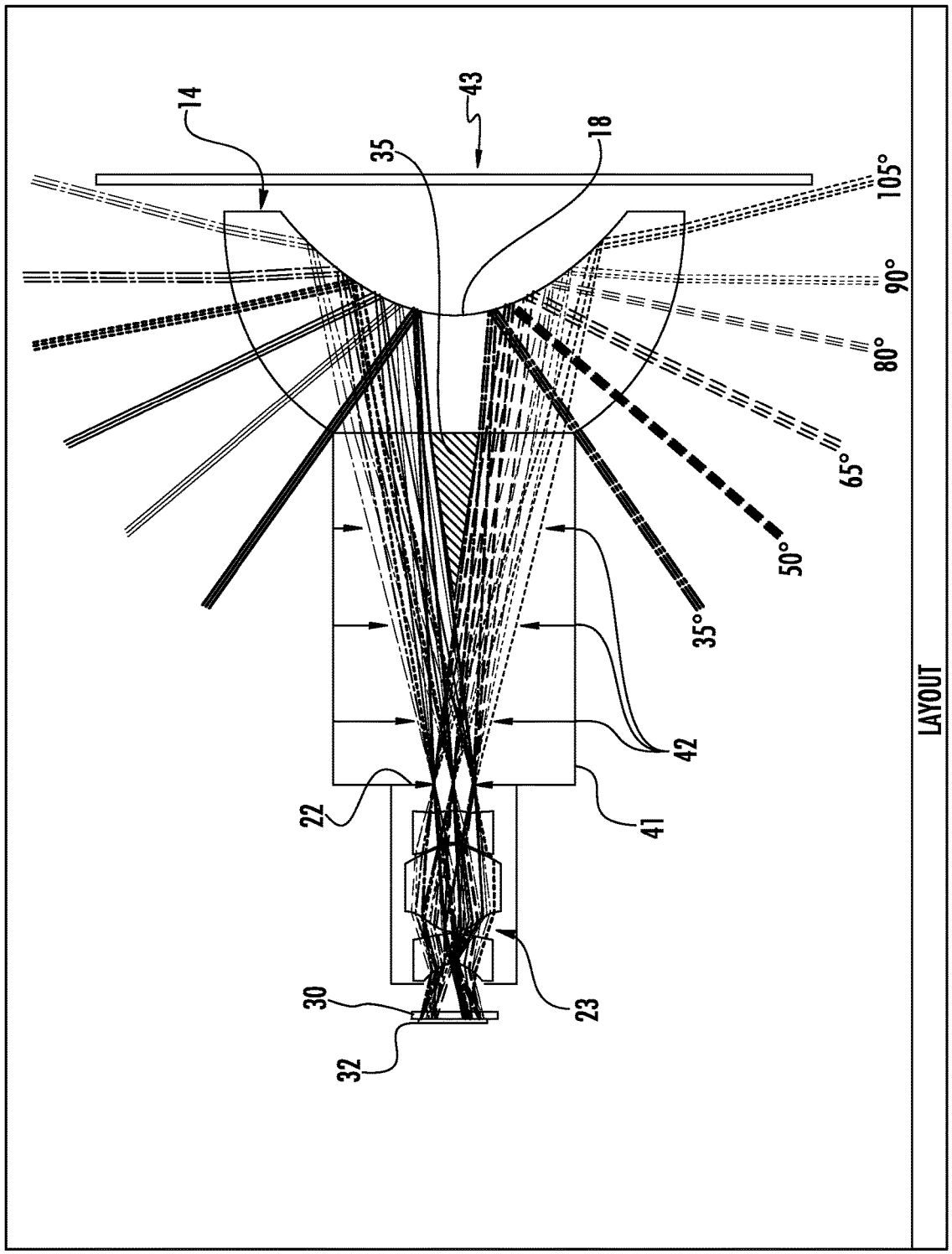
FIG. 20 is an alternative optical system layout with a housing, a hood, a spike and a diaphragm, according to a fifth example embodiment.

FIG. 20 shows an alternative optical system layout according to a fifth example embodiment. The fifth embodiment is a modification of the first embodiment in that the optical system layout includes a spike 35, a housing 41, a light trap diaphragm 42, and a hood 43. The convex reflector 18 has a diameter of 24.2 mm and the image sensor 32 has a diameter of 4.5 mm. Thus the convex reflector to image sensor ratio is 5.4:1. The spike 35 may be disposed along the vertical optical axis 12 and extend at least partially into the interior of the housing 41. The spike 35 provides improved stability of the overall optic and reduces unwanted glare in images reflected to the camera. The housing 41 is used to contain the light trap diaphragm 42. The light trap diaphragm 42 is a tapered annular diaphragm (i.e., contains a conical cutout) which stops the passage of light, except for the light passing through the hardware aperture 22. The hood 43 serves the purpose of reducing lens flare as well as protecting the optical system from damage.

Figure 21:
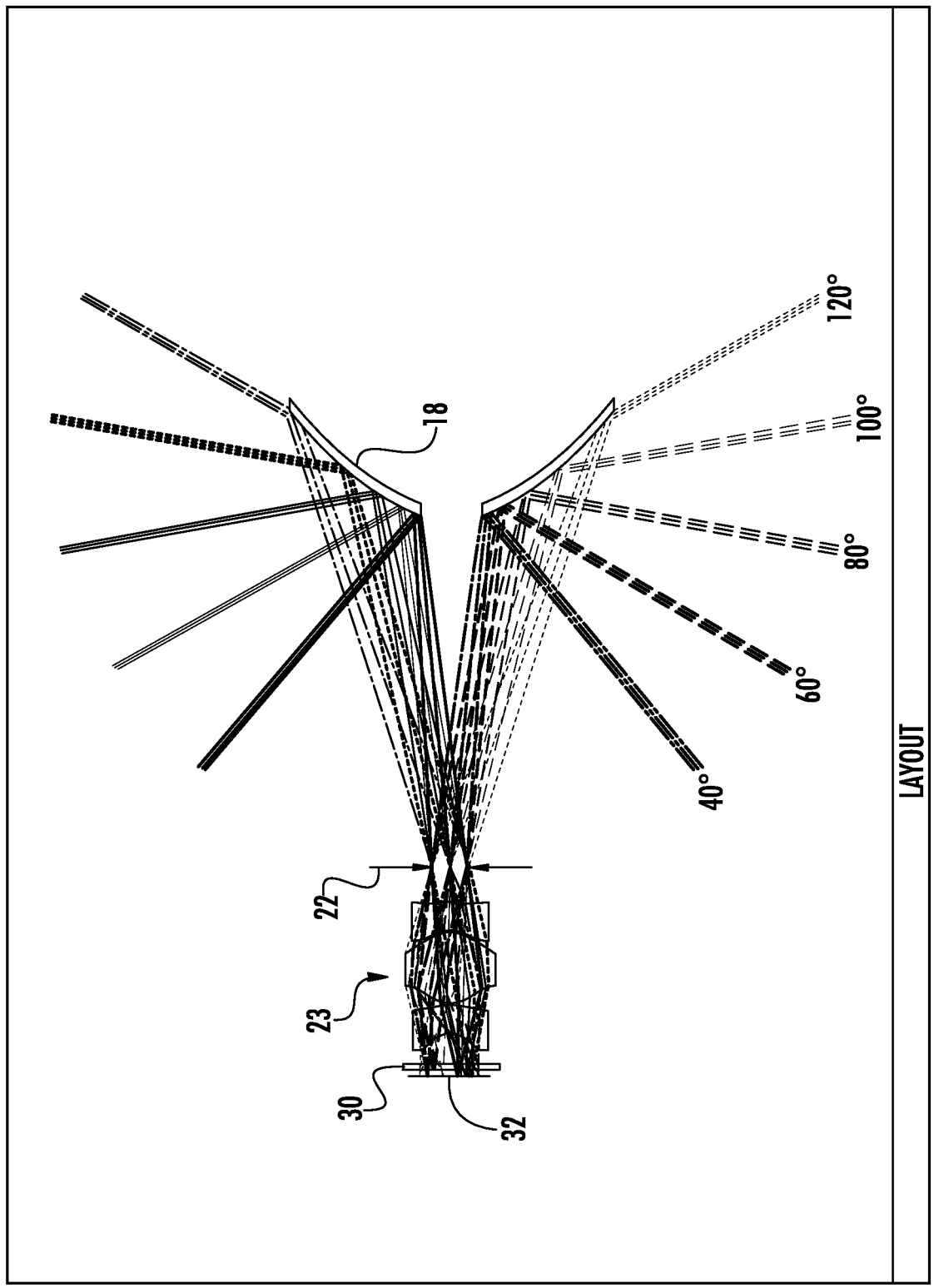
FIG. 21 is a compact panoramic camera with EVFOV 80 degrees: 30 degrees up and 50 degrees down from horizon, according to a sixth example embodiment.

FIG. 21 shows an alternative compact panoramic camera according to a sixth example embodiment. The sixth embodiment is a modification of the first embodiment in that the embodiment includes an optical system with EVFOV of 80 degrees: 30 degrees up and 50 degrees down from the horizon. The convex reflector 18 has a diameter of 24.2 mm and the image sensor 32 has a diameter of 4.6 mm. Thus the convex reflector to image sensor ratio is 5.3:1. According to an example embodiment, the overall length of the optical system of FIG. 21 is 51.2 mm. In other embodiments, the overall length of the optical system of FIG. 21 is greater or lesser than 51.2 mm.

Figure 22:
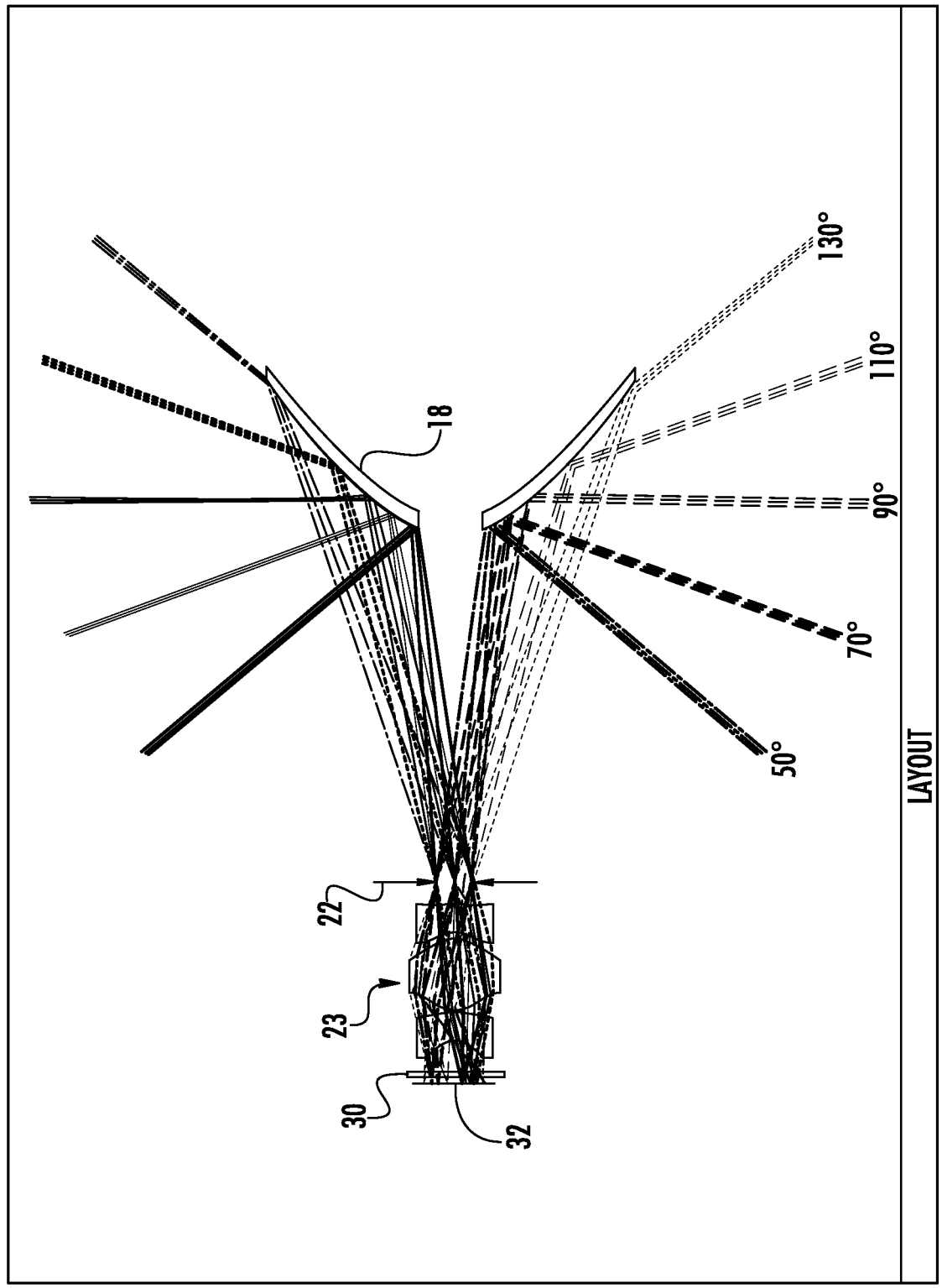
FIG. 22 is a compact panoramic camera with EVFOV 80 degrees: 40 degrees up and 40 degrees down from horizon, according to a seventh example embodiment.

FIG. 22 shows an alternative compact panoramic camera according to a seventh example embodiment. The seventh embodiment is a modification of the first embodiment in that this embodiment includes an optical system with EVFOV of 80 degrees: 40 degrees up and 40 degrees down from the horizon. The convex reflector 18 has a diameter of 26.4 mm and the image sensor 32 has a diameter of 4.6 mm. Thus the convex reflector to image sensor ratio is 5.7:1. According to an example embodiment, the overall length of the optical system of FIG. 22 is 49.1 mm. In other embodiments, the overall length of the optical system of FIG. 22 is greater or lesser than 49.1 mm.

Figure 23:
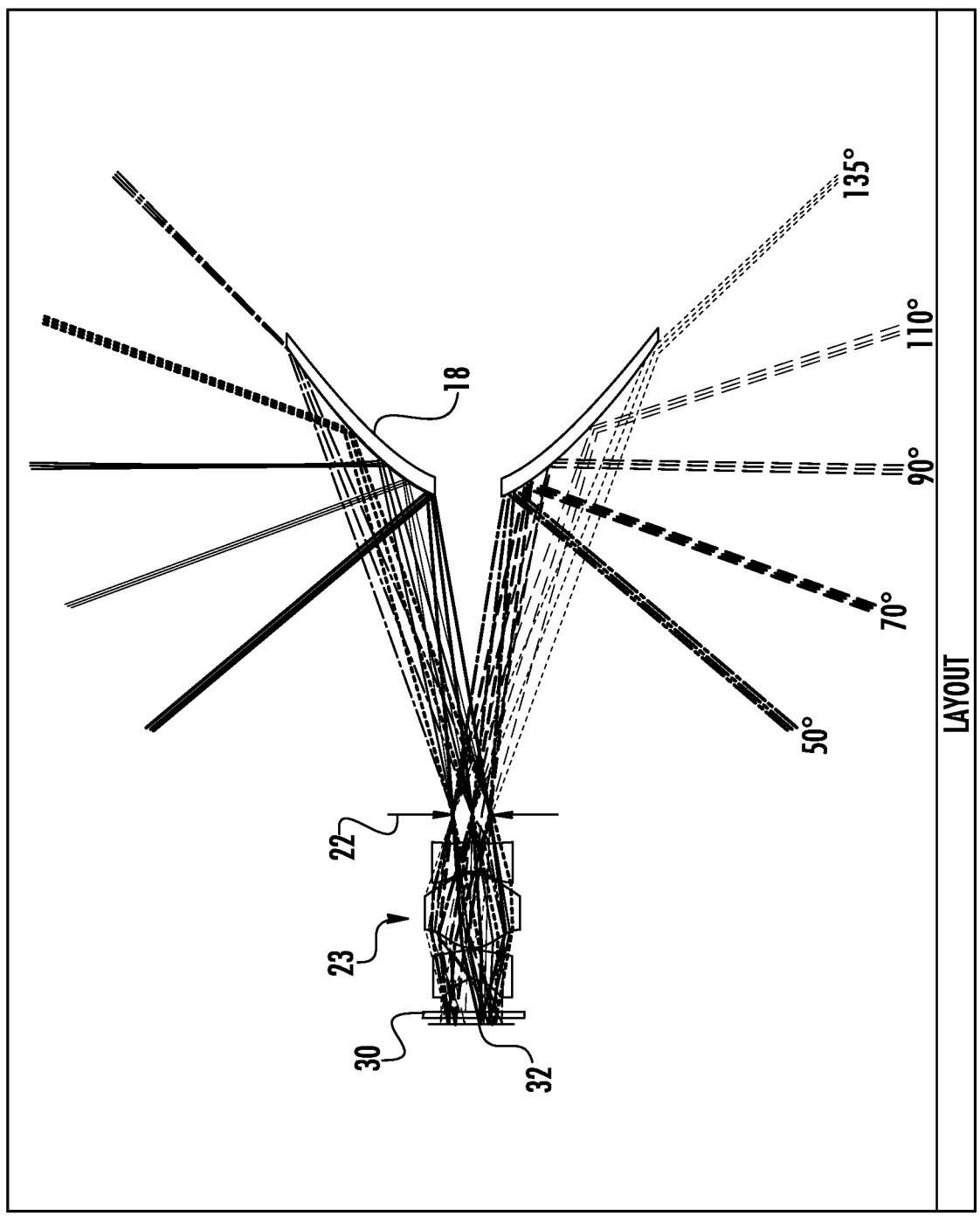
FIG. 23 is a compact panoramic camera with EVFOV 85 degrees: 45 degrees up and 40 degrees down from horizon, according to an eighth example embodiment.

FIG. 23 shows an alternative compact panoramic camera according to an eighth example embodiment. The eighth embodiment is a modification of the first embodiment in that this embodiment includes an optical system with EVFOV of 85 degrees: 45 degrees up and 40 degrees down from the horizon. The convex reflector 18 has a diameter of 25.3 mm and the image sensor 32 has a diameter of 4.6 mm. Thus the convex reflector to image sensor ratio is 5.5:1. According to an example embodiment, the overall length of the optical system of FIG. 23 is 47.2 mm. In other embodiments, the overall length of the optical system of FIG. 23 is greater or lesser than 47.2 mm.

Figure 24:
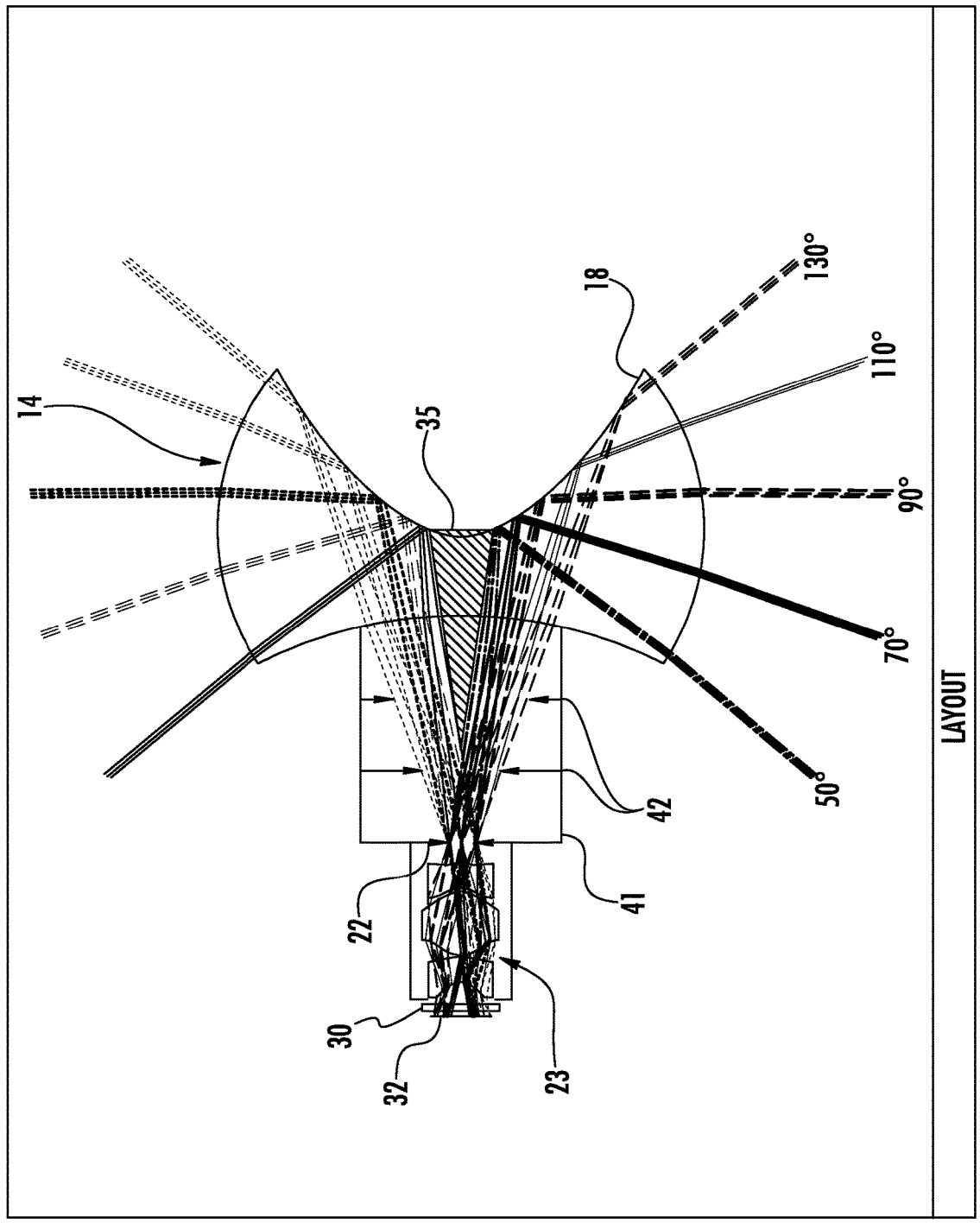
FIG. 24 is a compact panoramic camera with EVFOV 80 degrees: 40 degrees up and 40 degrees down from horizon and a COE with an alternative shape, according to a ninth example embodiment.

FIG. 24 shows an alternative compact panoramic camera according to a ninth example embodiment. The ninth embodiment is a modification of the first embodiment in that this embodiment includes an optical system with EVFOV of 80 degrees: 40 degrees up and 40 degrees down from the horizon, a COE 14 with an alternative shape, a spike 35, a housing 41, and a light trap diaphragm 42. The COE 14 with an alternative shape includes three optical surfaces: the convex reflector 18 which may be any aspheric shape (e.g., hyperbolic, parabolic, etc.), and two spherical refractive surfaces may be connected to the convex reflector 18. In other embodiments, the two refractive surfaces may be a variety of shapes (e.g., linear, parabolic, hyperbolic, aspheric, etc.). The spike 35 may be disposed along the vertical optical axis 12 and extend at least partially into the interior of the housing 41. The spike 35 provides improved stability of the overall optic and reduces unwanted glare in images reflected to the camera. The housing 41 is used to contain the light trap diaphragm 42. The light trap diaphragm 42 is a tapered annular diaphragm (i.e., contains a conical cutout) which stops the passage of light, except for the light passing through the hardware aperture 22. The convex reflector 18 has a diameter of 27.8 mm and the image sensor 32 has a diameter of 4.5 mm. Thus the convex reflector to image sensor ratio is 6.2:1.

Figure 25:
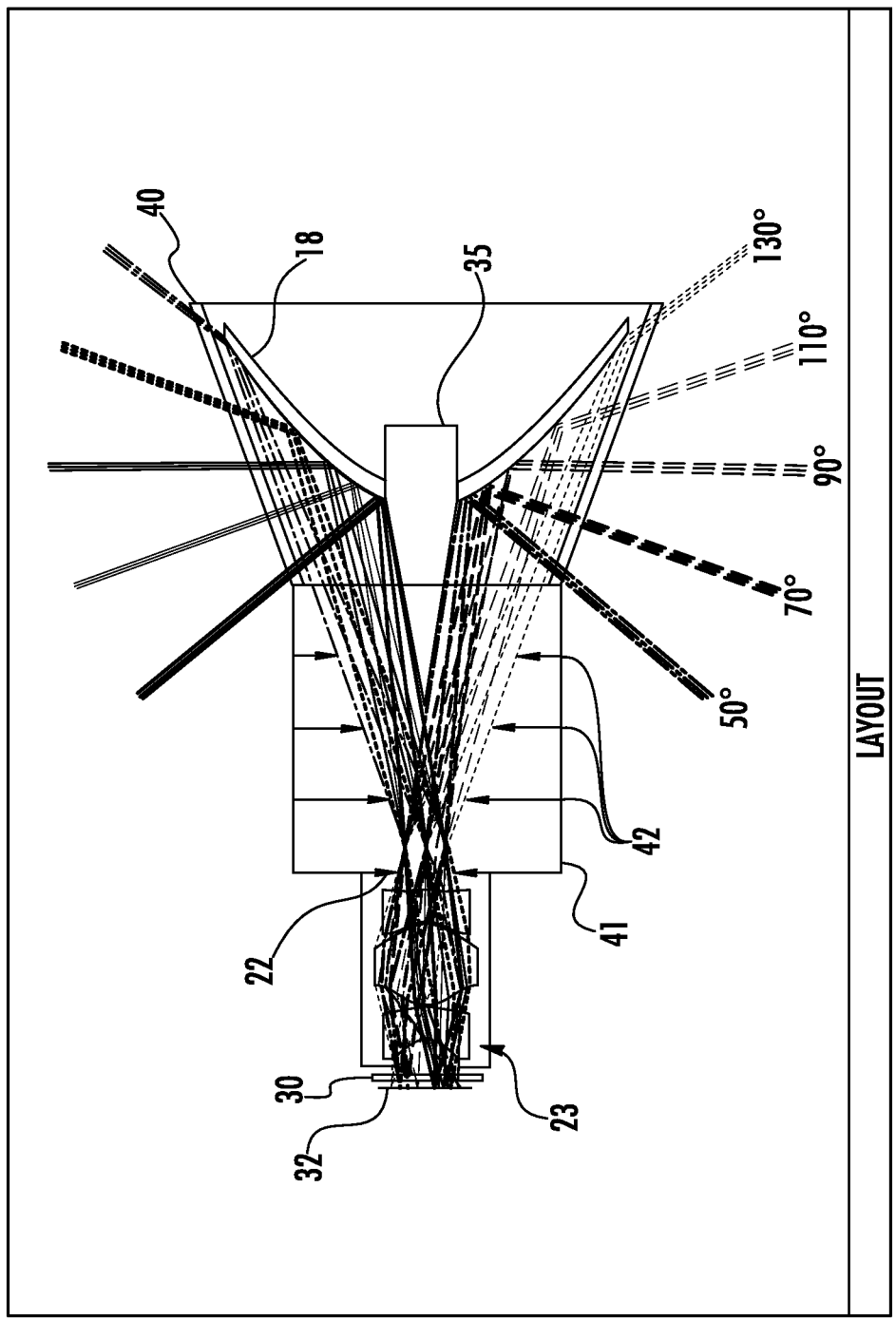
FIG. 25 is a compact panoramic camera with EVFOV 80 degrees: 40 degrees up and 40 degrees down from horizon with a central spike, housing, a protective cone window, and a light trap diaphragms, according to a tenth example embodiment.

FIG. 25 shows an alternative compact panoramic camera according to a tenth example embodiment. The tenth embodiment is a modification of the first embodiment in that this embodiment includes an optical system with EVFOV of 80 degrees: 40 degrees up and 40 degrees down from the horizon, a spike 35, an acrylic cone window 40, a housing 41, and a light trap diaphragm 42. The spike 35 may be disposed along the vertical optical axis 12 and extend at least partially into the interior of the housing 41. The spike 35 provides improved stability of the overall optic and reduces unwanted glare in images reflected to the camera. The acrylic cone window 40 acts as a refractive surface as the light travels through it, as well as adds support to the mounting of the convex reflector 18. The housing 41 is used to contain the light trap diaphragm 42. The light trap diaphragm 42 is a tapered annular diaphragm (i.e., contains a conical cutout) which stops the passage of light, except for the light passing through the hardware aperture 22. The convex reflector 18 has a diameter of 27.0 mm and the image sensor 32 has a diameter of 4.5 mm. Thus the convex reflector to image sensor ratio is 6:1.

Figure 26:
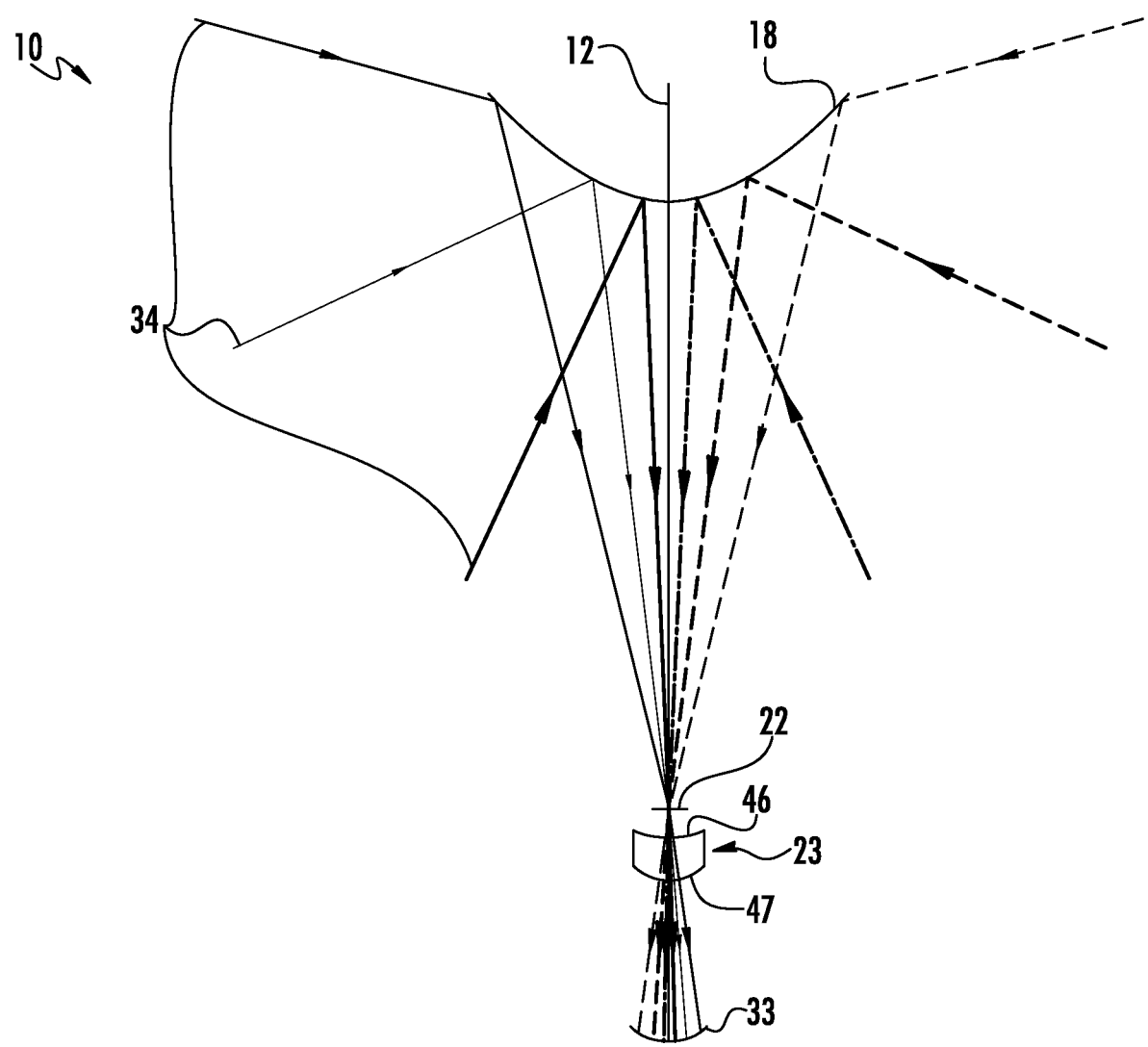
FIG. 26 is a compact panoramic camera with EVFOV 80 degrees: 15 degrees up and 65 degrees down from horizon, according to an eleventh example embodiment.
Figure 27:
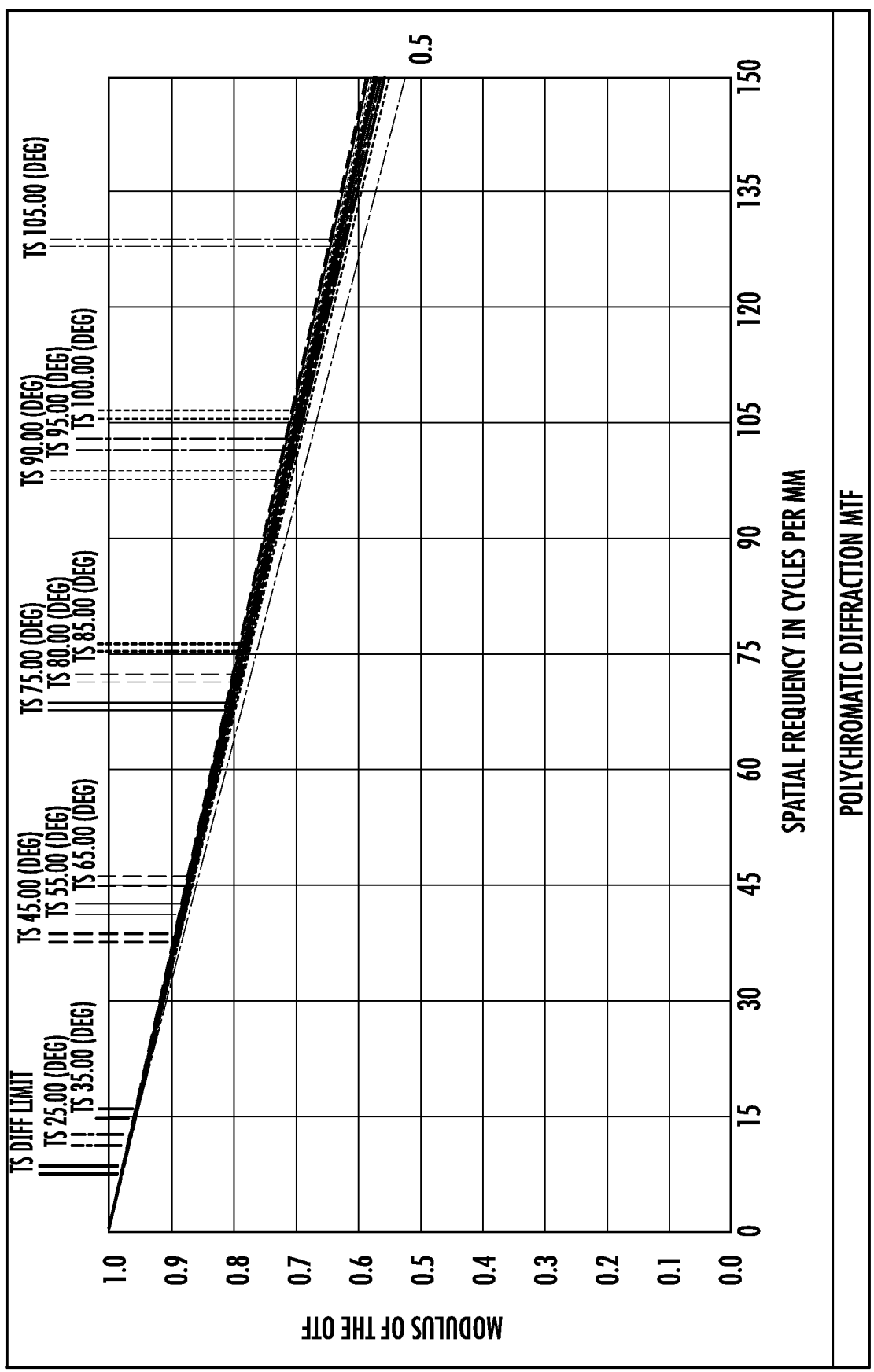
FIG. 27 is a graph of polychromatic diffraction MTF for twelve vertical view points for the arrangement of FIG. 26, according to an eleventh example embodiment.
Figure 28:
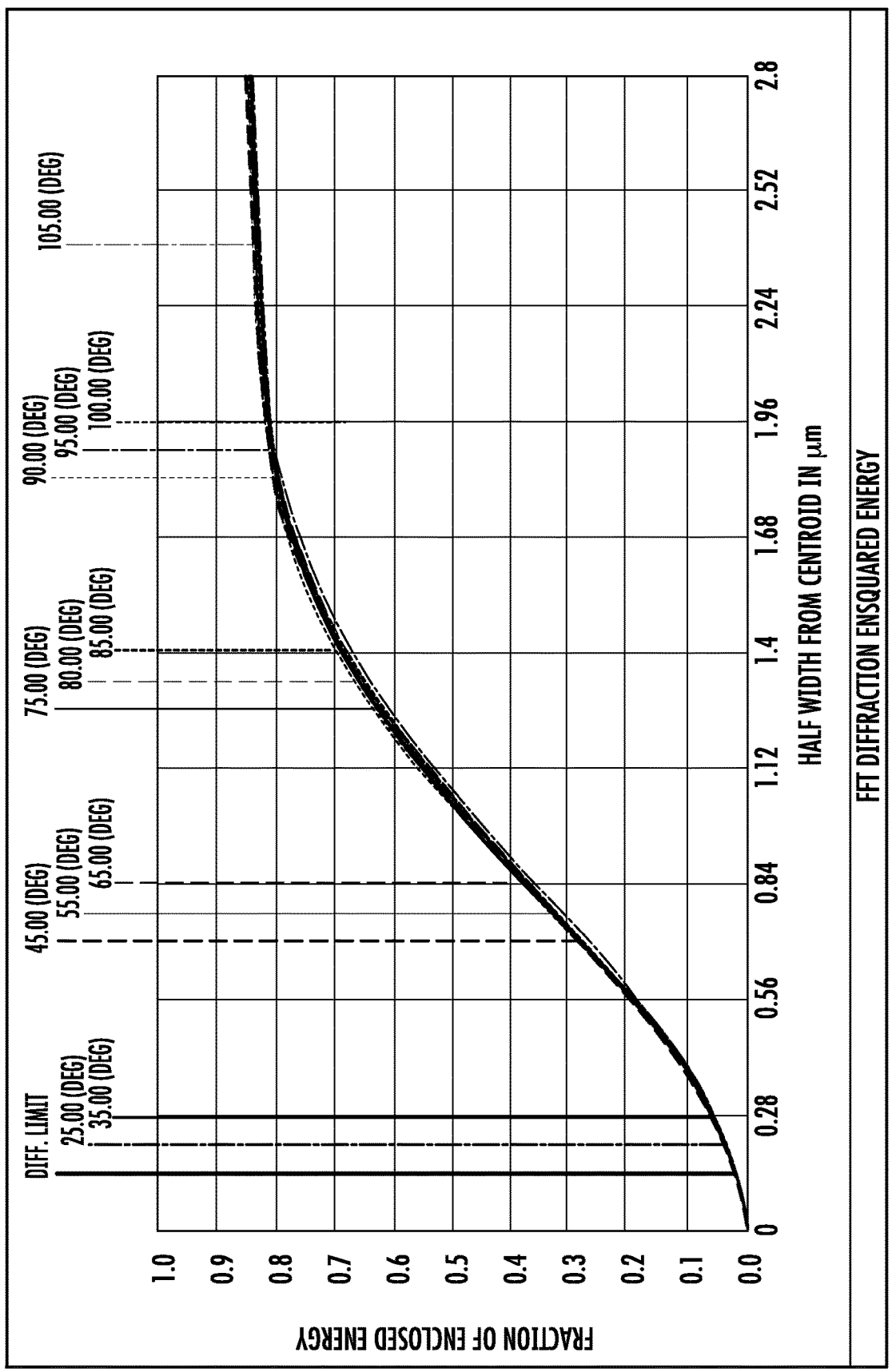
FIG. 28 is a graph of diffraction ensquared energy for the arrangement of FIG. 26, according to an eleventh example embodiment.
Figure 29:
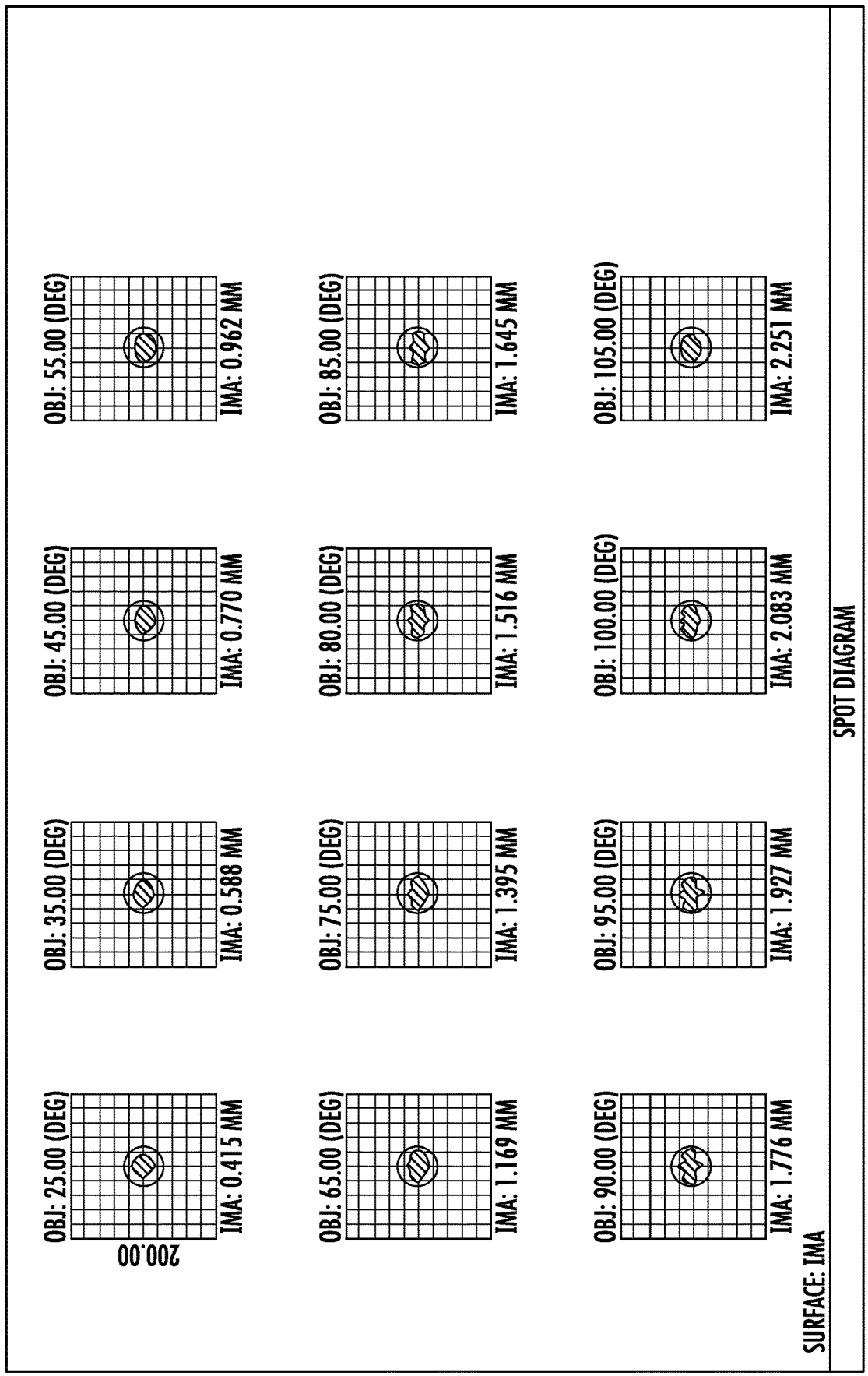
FIG. 29 shows an image of spot diagram for twelve vertical view points for the arrangement of FIG. 26, according to an eleventh example embodiment.
Figure 30:
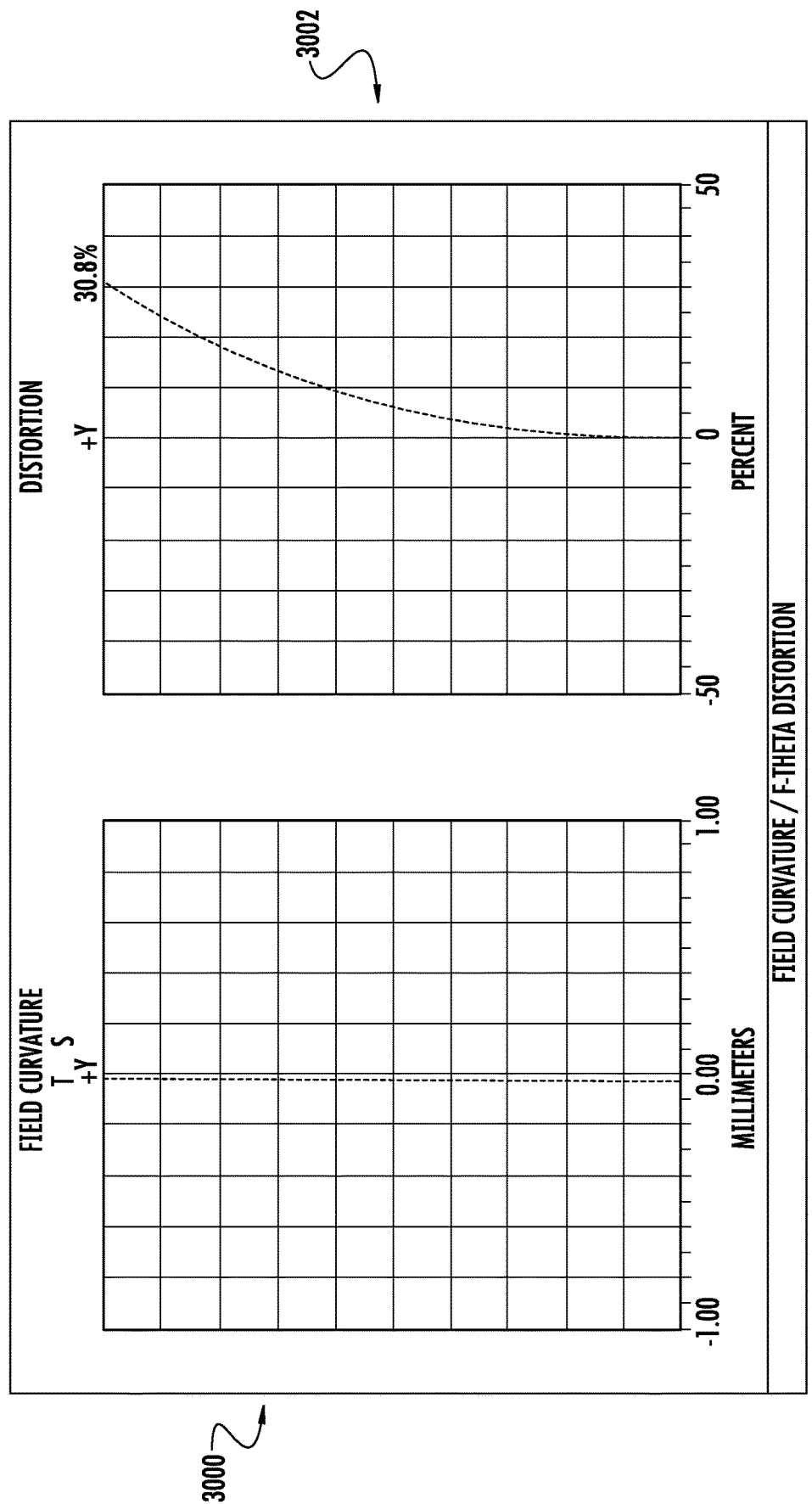
FIG. 30 is a depiction of field curvature and distortion graphs for the arrangement of FIG. 26, according to an eleventh example embodiment.

Referring now to FIG. 26, an optical system layout of the compact panoramic camera is shown, according to an eleventh example embodiment. The optical system 10 with axis of symmetry, vertical optical axis 12, as itself includes two main optical components: a convex reflector 18 (e.g., a hyperbolic mirror) and a decompression lens 23, which is comprised of a single lens element. The optical system 10 further includes a hardware aperture 22 and a curved image sensor 33 (i.e., 3D). In other embodiments, the image sensor may be a flat image senor, such as the image sensor 32. The diameter of the hyperbolic convex reflector 18 is 25.6 mm, the conic constant is negative 1.4, and radius of curvature at the vertex is 9.346 mm, the same as for the first embodiment (FIG. 1). The single lens element of the decompression lens 23 includes a first surface 46 and a second surface 47, each having different aspheric shapes. Working together, the first surface 46 and the second surface 47 are capable of effectively correcting all field aberrations except field curvature, as well as decompress the virtual image compression created by hyperbolic mirror, convex reflector 18. As a result, the optical system 10 has a diffraction limited image quality by using aperture F/4, which is confirmed by diffraction MTF (FIG. 27), diffraction ensquared energy concentration (FIG. 28), and spot diagram (FIG. 29). The decompression ability of the single lens element of the decompression lens 23 is confirmed by F-theta distortion graph 3002 (FIG. 30), which indicates 30.8% decompression for field of view edge 105 degrees (15 degree up from the horizon). The decompression lens 23 may have a positive optical power and a focal length of 8.8 mm. The optical system 10 (FIG. 26) may be monochromatic and have a working wavelength of 546 nanometers.

Figure 31:
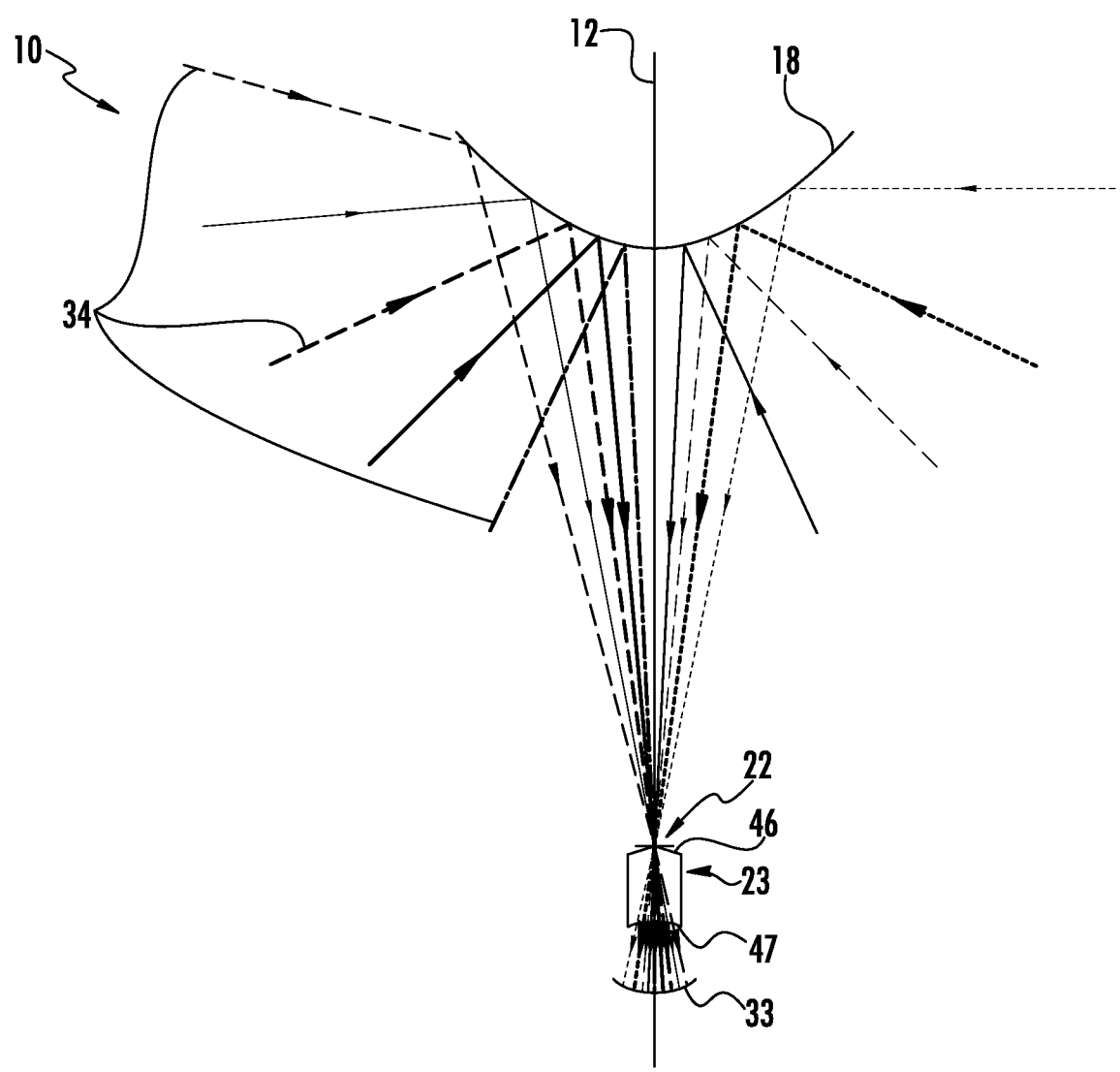
FIG. 31 is a compact panoramic camera with EVFOV 80 degrees: 15 degrees up and 65 degrees down from horizon, according to a twelfth example embodiment.
Figure 32:
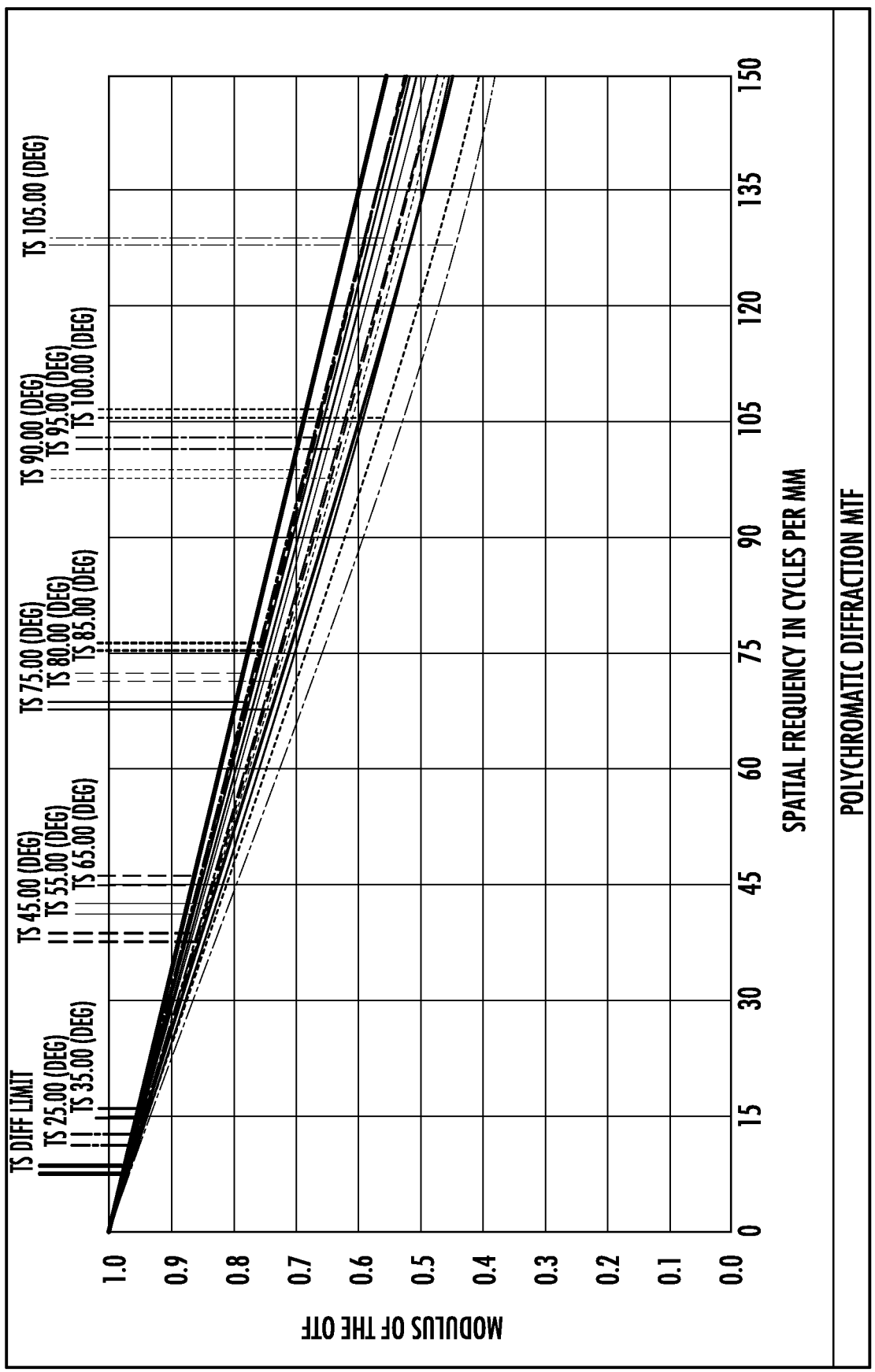
FIG. 32 is a graph of polychromatic diffraction MTF for twelve vertical view points for the arrangement of FIG. 31, according to a twelfth example embodiment.
Figure 33:
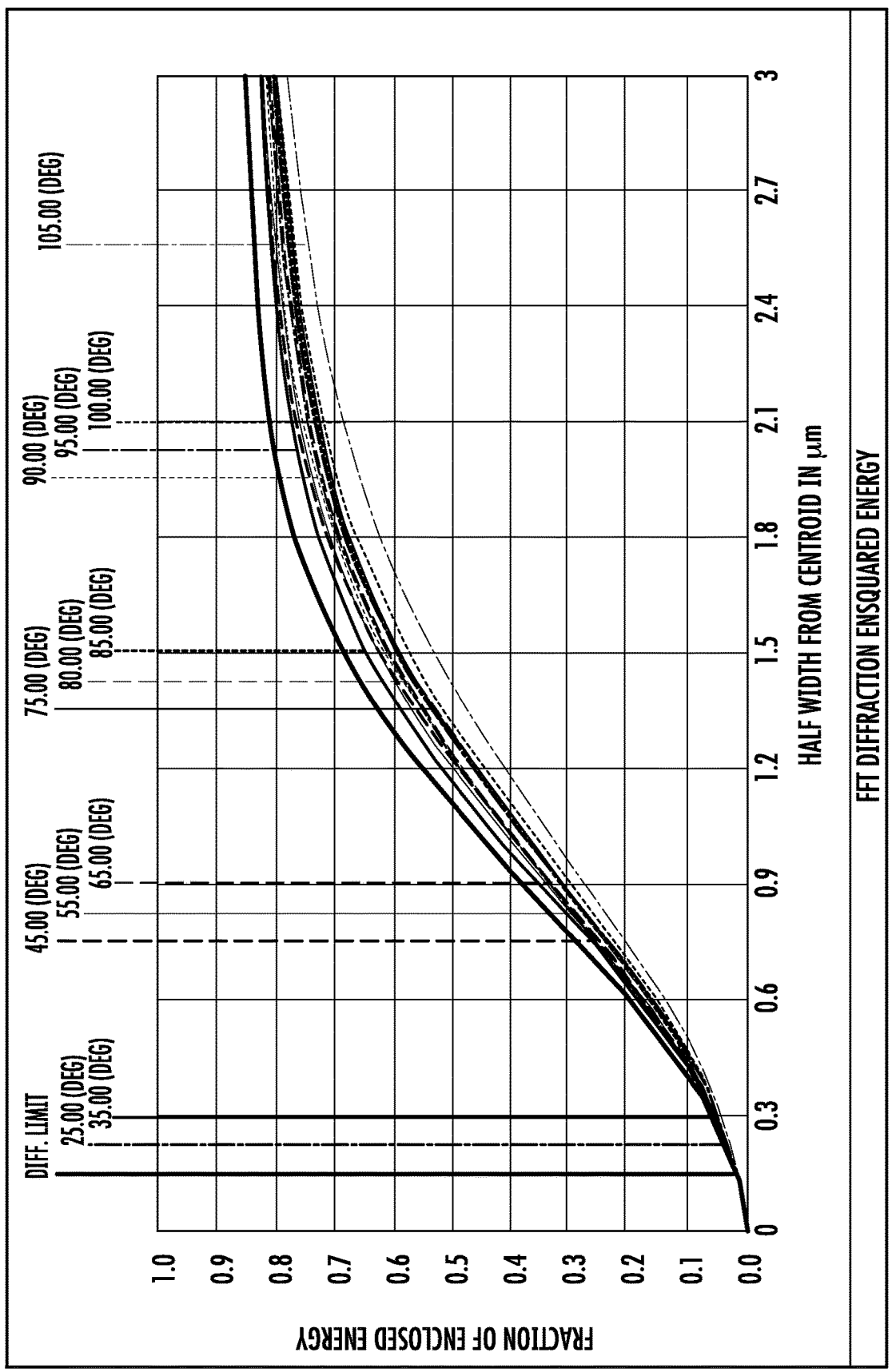
FIG. 33 is a graph of diffraction ensquared energy for the arrangement of FIG. 31, according to a twelfth example embodiment.
Figure 34:
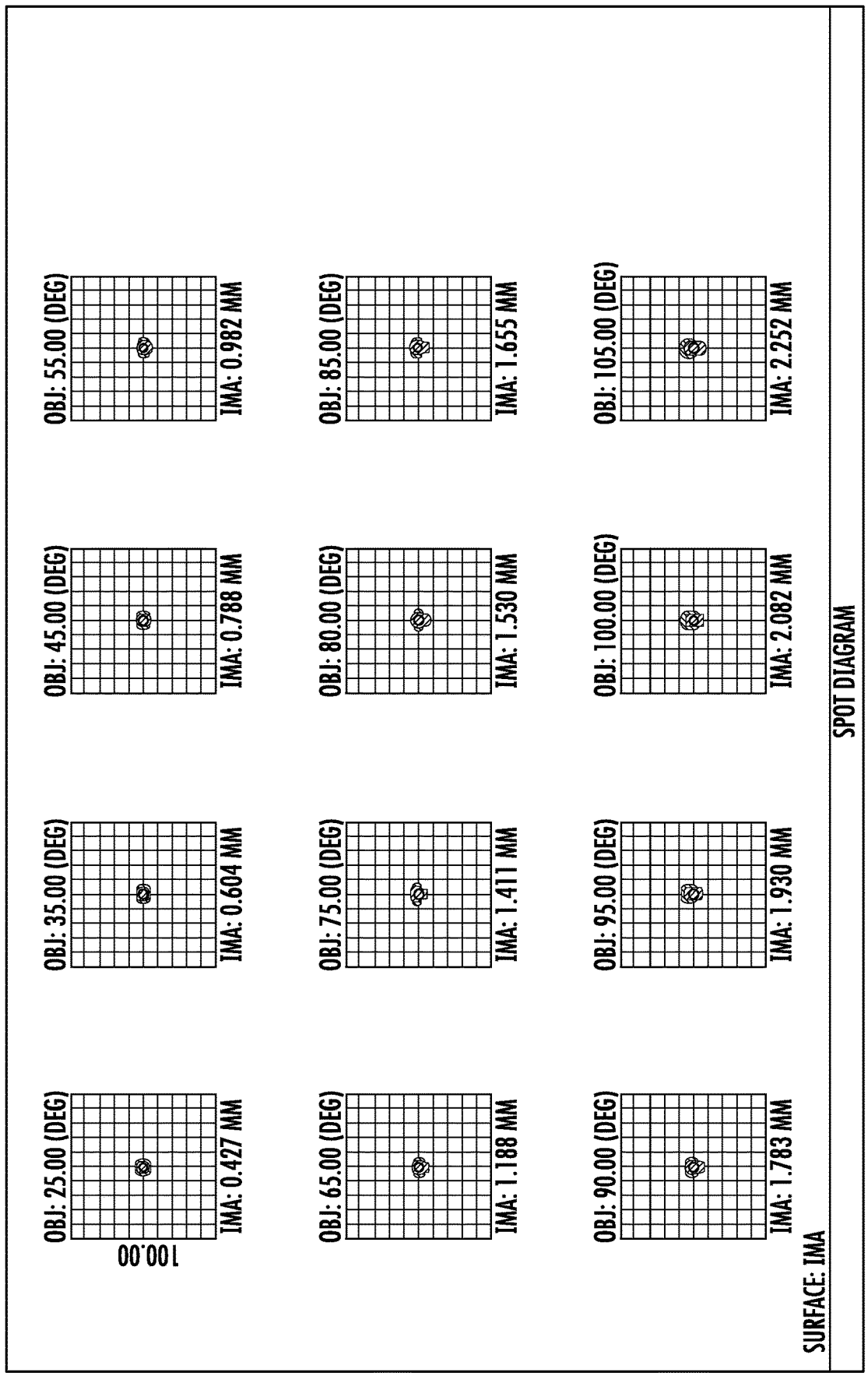
FIG. 34 shows an image of spot diagram for twelve vertical view points for the arrangement of FIG. 31, according to a twelfth example embodiment.
Figure 35:
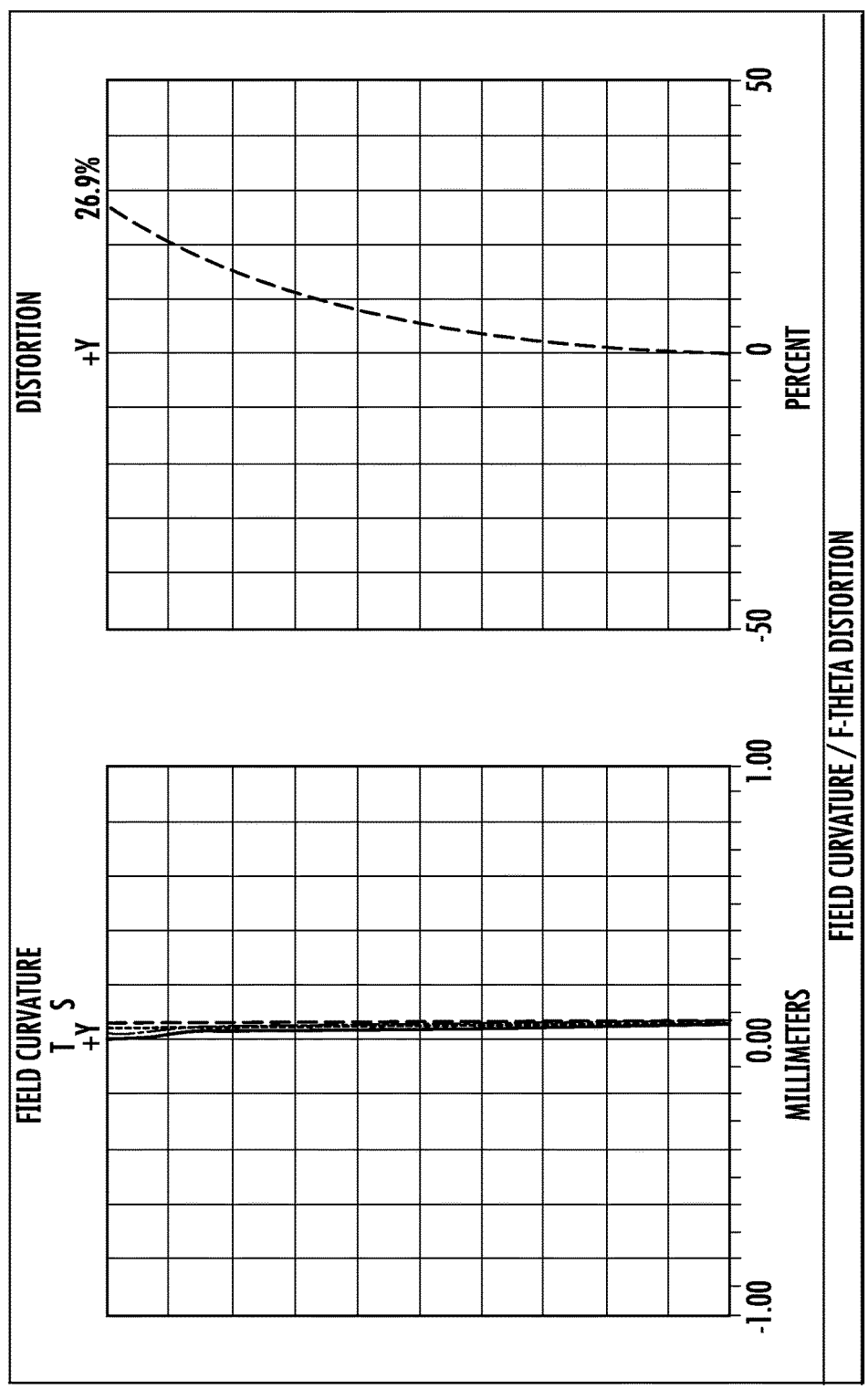
FIG. 35 is a depiction of field curvature and distortion graphs for the arrangement of FIG. 31, according to a twelfth example embodiment.
Figure 36:
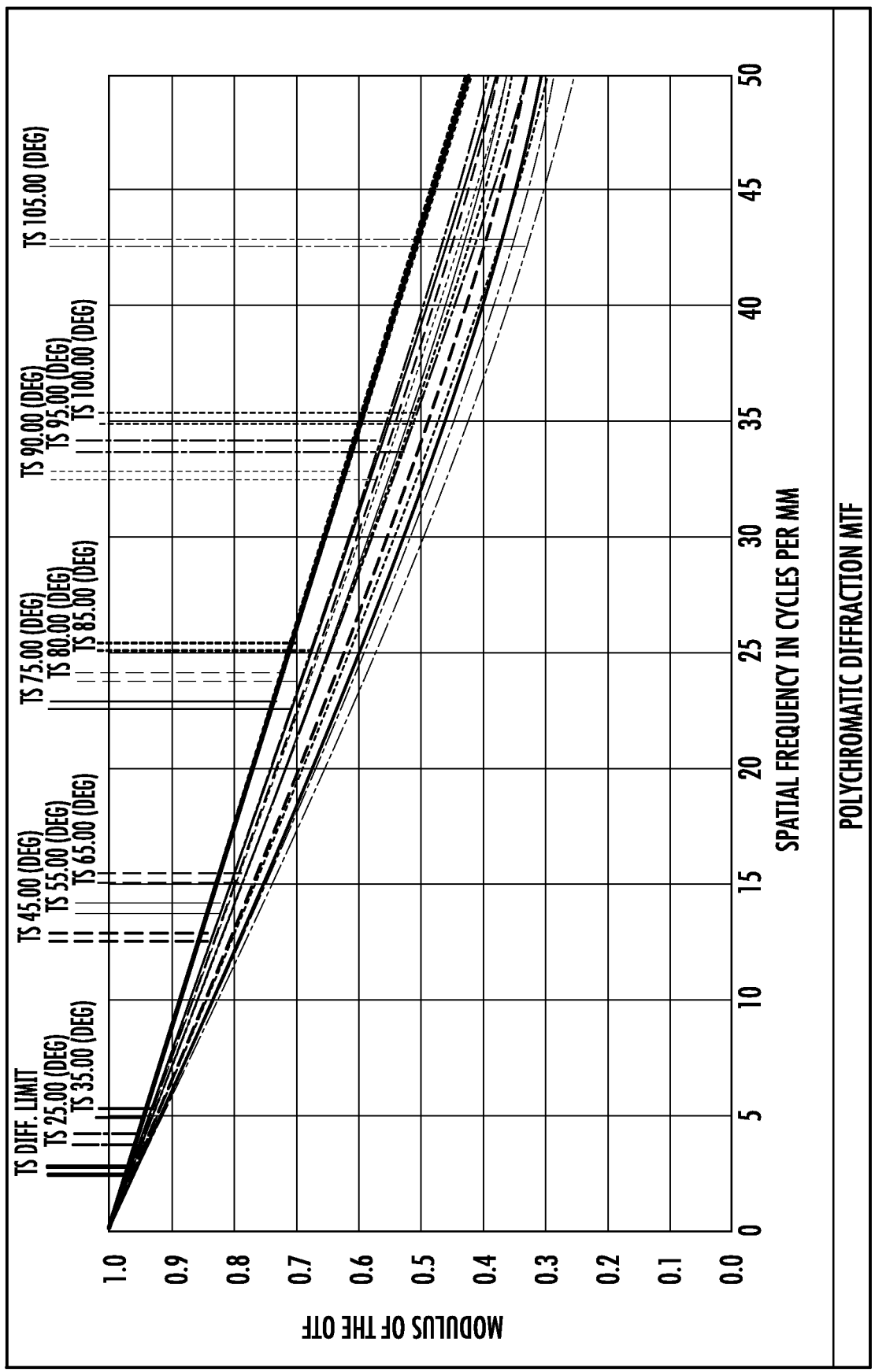
FIG. 36 is a graph of polychromatic diffraction MTF for twelve vertical view points for the arrangement of FIG. 31 with a flat image sensor, according to a thirteenth example embodiment.

Nevertheless, it is possible to correct chromatic aberrations having only a single lens element acting as a decompression lens, such as the decompression lens 23 in FIG. 31, by making one of its optical surface a diffractive one. This is realized in the twelfth example embodiment (FIG. 31) by making the first surface 46 a diffractive surface. The optical system 10 has a high optical resolution for aperture F/4, which is confirmed by polychromatic diffraction MTF (FIG. 32), diffraction ensquared energy concentration (FIG. 33), and spot diagram (FIG. 34). The parabolic type of image compression is confirmed by F-theta distortion graph 3502 (FIG. 35) with 26.9% decompression for the FOV edge. The optical system 10 (FIG. 31) has an effective vertical field of view 80 degrees: 15 degrees up and 65 degrees down from the horizon. The convex hyperbolic mirror, the convex reflector 18, has a high order aspheric surface, its diameter is 24.5 mm, and the conic constant and radius of curvature at the vertex are the same as for the eleventh example embodiment (FIG. 26).

The first surface 46 and the second surface 47 of the decompression lens 23 of FIG. 31 have different aspheric shapes. The first surface 46 may include a diffractive optical structure on a top of its aspheric surface. Working together, the first surface 46 and the second surface 47 are capable of effectively correcting chromatic aberrations and all field aberrations except field curvature, as well as decompress the virtual image compression created by the convex reflector 18. To improve the color correction even further, the first surface 46 of the single lens element of the decompression lens 23 may be coated by a thin film IR cut-off filter, which blocks the light wavelengths starting approximately from 680 nm and up. Another advantage of the IR filter coating is optical element reduction: otherwise an additional flat filter element may need to be placed in a front of the curved image sensor 33. The sharpest image is located on the concave surface of curved image sensor 33. It is still possible to get a sharp image on a flat sensing surface, such as image sensor 32, if relying on depth of focus and using pinhole aperture with F-stop 16 or 22. Another possibility is to use a fiber optic flattener or Smith lens as a sensor surface cover. Both cases convert the single element decompression lens concept into a dual one.

Figure 37:
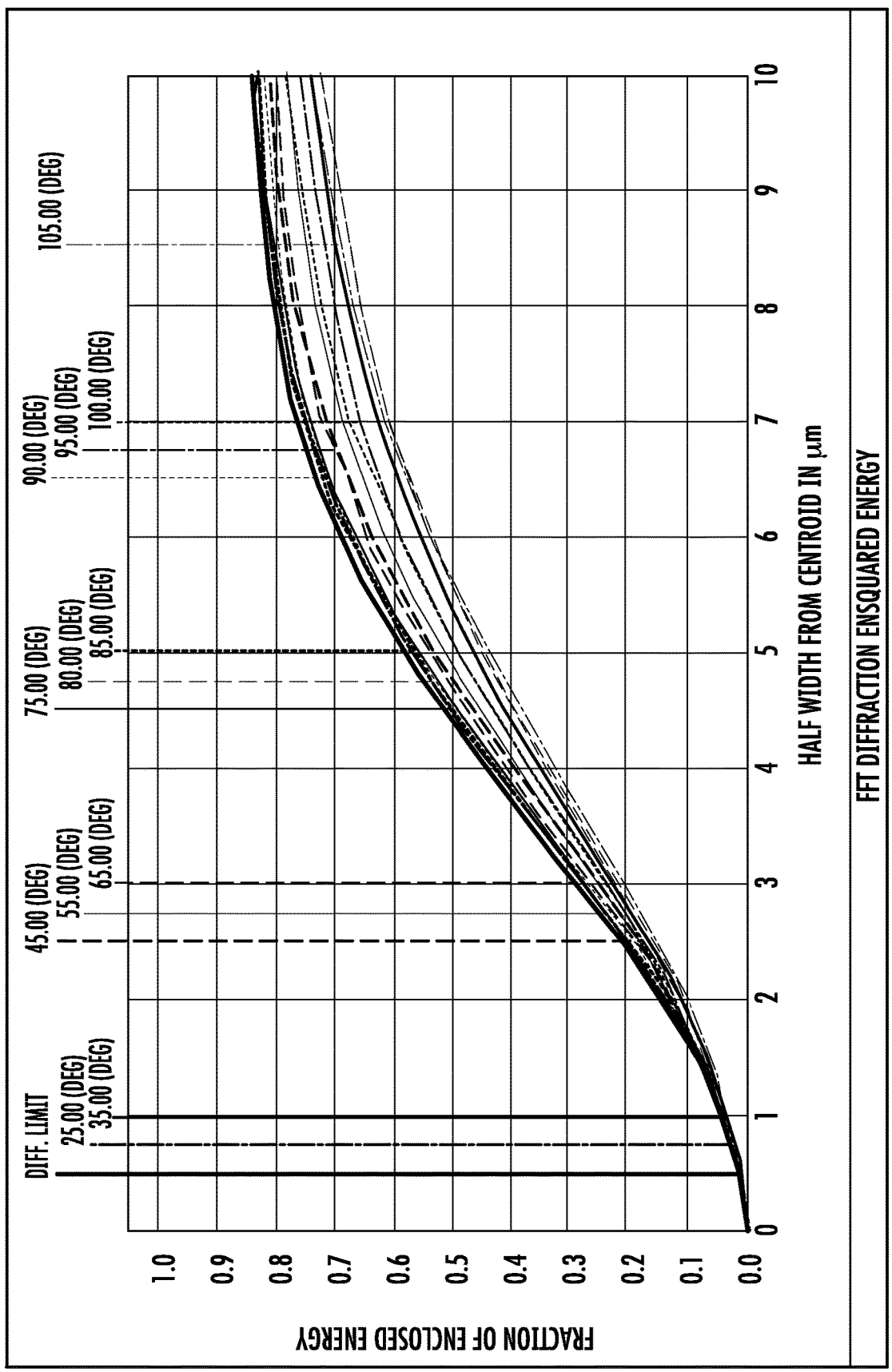
FIG. 37 is a graph of diffraction ensquared energy for the arrangement of FIG. 31 with a flat image sensor, according to a thirteenth example embodiment.
Figure 38:
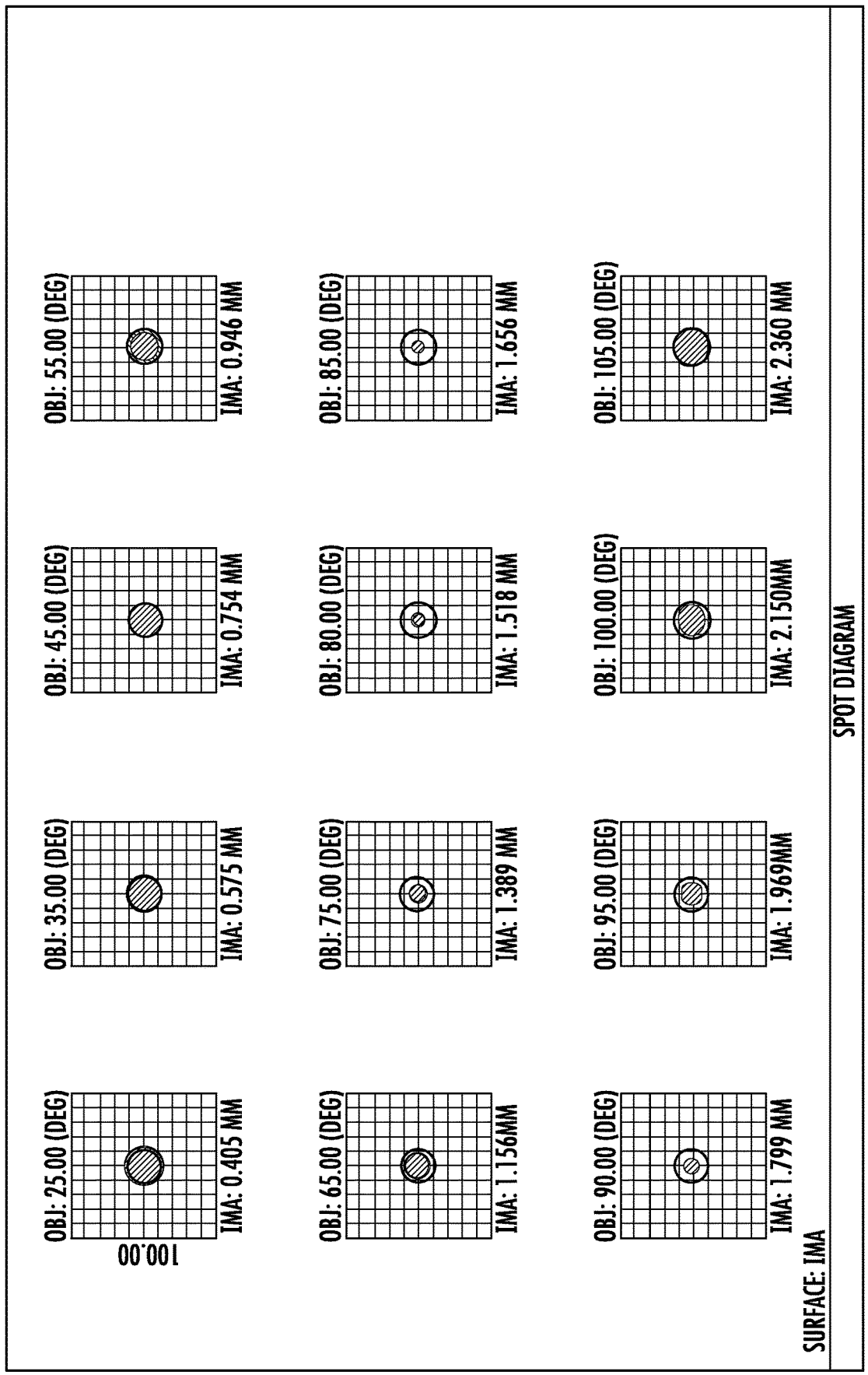
FIG. 38 shows an image of spot diagram for twelve vertical view points for the arrangement of FIG. 31 with a flat image sensor, according to a thirteenth example embodiment.
Figure 39:
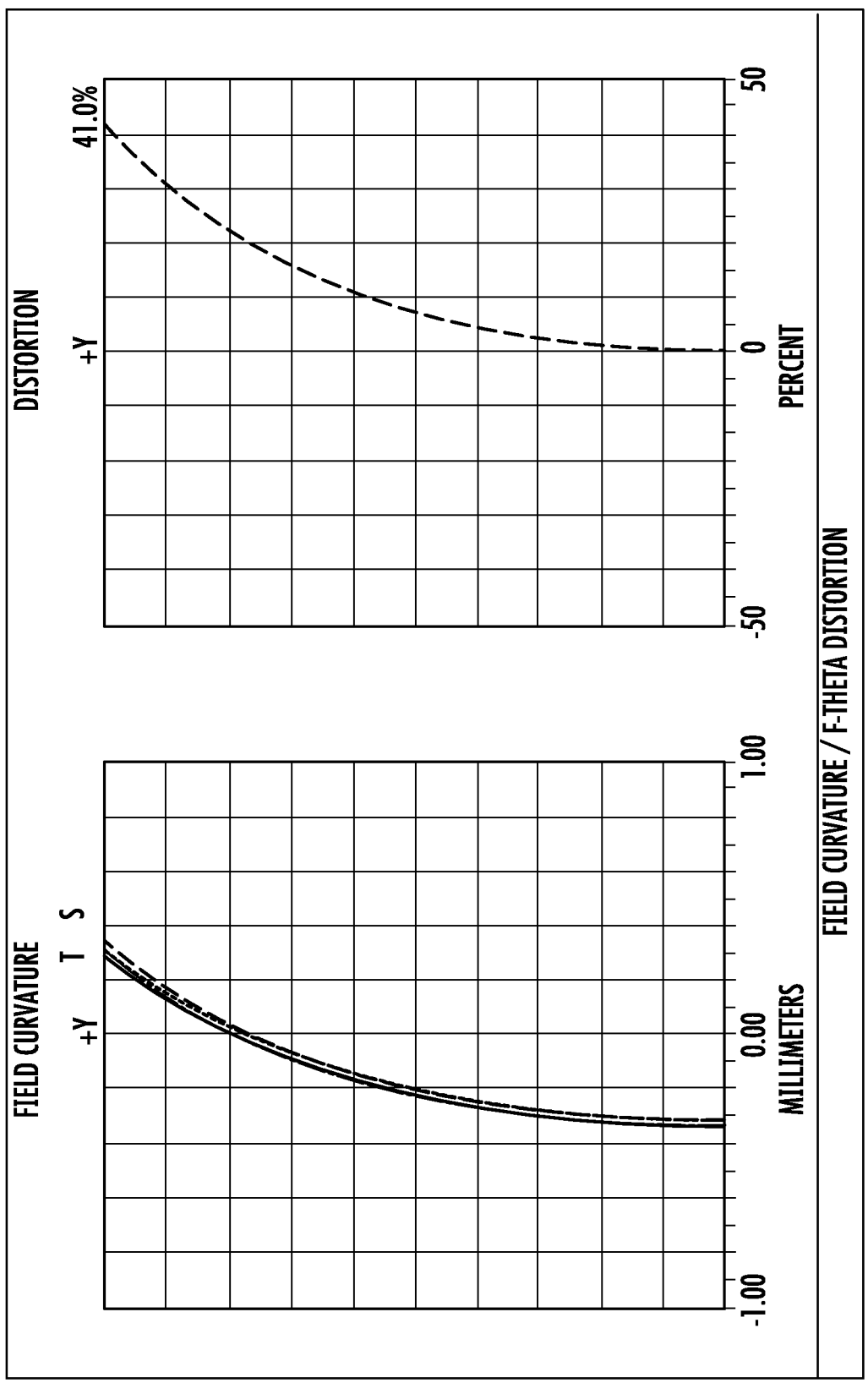
FIG. 39 is a depiction of field curvature and distortion graphs for the arrangement of FIG. 31 with a flat image sensor, according to a thirteenth example embodiment.

By reducing the diameter of the aperture 22 in FIG. 31 from 2.20 mm down to 0.55 mm, the F-stop of the optical system 10, becomes 16 instead of 4. FIGS. 36-39 characterize the image quality on a flat surface, such as the image sensor 32, after refocusing. The maximum optical resolution is 50 cy/mm for contrast 0.3-0.4 (FIG. 36), and 70% light energy concentrates on the area 16×16 microns on average (FIG. 37). As a result, the image quality reduction on a flat sensing surface is about four times less as compared with the 3D sensing surface, such as the curved image sensor 33.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

It is to be understood that the inventions disclosed herein are not limited to the details of construction and the arrangement of the components set forth in the description or illustrated in the drawings. The inventions are capable of other embodiments or being practiced or carried out in various ways. It is also to be understood that the phraseology and terminology employed herein is for the purpose of description and should not be regarded as limiting.

It is also important to note that although only a few embodiments of the fitting have been described in detail in this disclosure, those skilled in the art who review this disclosure will readily appreciate that many modifications are possible (e.g., variations in size, dimensions, structures, shapes and portions of the various elements, values of parameters, mounting arrangements, materials, colors, orientations, etc.) without materially departing from the novel teachings and advantages of the subject matter recited in the disclosed embodiments. Accordingly, all such modifications are intended to be included within the scope of the present disclosure as defined in the disclosed embodiments.

The invention claimed is:

1. An optical system for a compact panoramic camera, the optical system comprising:
    a catadioptric optical element including a convex reflector having (i) a first diameter and (ii) a non-parabolic, axially symmetric, aspheric surface that provides a virtual curved and compressed image of a panoramic scene having a non-parabolic image compression;
    a hardware aperture spaced from the catadioptric optical element, the hardware aperture positioned to filter out light rays other than those reflected directly from the convex reflector;
    a decompression lens positioned to receive the virtual curved and compressed image filtered by the hardware aperture, the hardware aperture positioned between the catadioptric element and the decompression lens, the decompression lens configured to:
        decompress the virtual curved and compressed image into a real image having a parabolic image decompression; and
        project the real image having the parabolic image decompression; and
    an image sensor positioned to receive the real image having the parabolic image decompression from the decompression lens;
    wherein the real image has a second diameter at the image sensor that is less than the first diameter;
    wherein a ratio of the first diameter to the second diameter is between 6.5:1 and 2.3:1; and
    wherein the optical system provides a polychromatic modulation transfer function of 30% or more for 150 cy/mm.

2. The optical system of claim 1, wherein the non-parabolic, axially symmetric, aspheric surface of the convex reflector has a hyperbolic shape.

3. The optical system of claim 2, wherein the catadioptric optical element further includes a first refractive surface positioned to receive light rays from the panoramic scene and a second refractive surface positioned to receive light rays reflected by the convex reflector, wherein the first refractive surface has an ellipsoidal shape.

4. The optical system of claim 1, wherein the decompression lens includes three or fewer lens elements.

5. The optical system of claim 4, wherein the decompression lens includes two or fewer lens elements.

6. The optical system of claim 5, wherein the decompression lens includes a single lens element having a first aspheric surface and an opposing second aspheric surface, and wherein at least one of the first aspheric surface or the opposing second aspheric surface has a diffractive optical structure disposed thereon.

7. The optical system of claim 4, wherein the decompression lens includes a first negative lens element having a negative optical power, a second negative lens element having a negative optical power, and a positive lens element having a positive optical power and positioned between the first negative lens element and the second negative lens element, wherein the first negative lens element, the second negative lens element, and the positive lens element each have one or more aspheric surfaces.

8. The optical system of claim 1, wherein the first diameter of the convex reflector is at most 32.4 millimeters.

9. The optical system of claim 1, wherein a length of the optical system between the catadioptric optical element and the image sensor is at most 60 millimeters.

10. The optical system of claim 1, wherein the optical system is packaged such that the compact panoramic camera has a volume of at most 3 cubic inches or approximately 49.16 cubic centimeters.

11. The optical system of claim 1, wherein the non-parabolic, axially symmetric, aspheric surface of the convex reflector is continuous and uninterrupted.

12. The optical system of claim 1, wherein the optical system has an effective vertical field of view of at least 70 degrees.

13. The optical system of claim 1, wherein the image sensor has a flat structure.

14. The optical system of claim 1, wherein the image sensor has a curved structure.

15. An optical system for a camera, the optical system comprising:
  a convex reflector having (i) a first diameter and (ii) a non-parabolic, axially symmetric, aspheric surface that provides a virtual curved and compressed image of a scene having a non-parabolic image compression;
  a decompression lens positioned to receive the virtual curved and compressed image, the decompression lens configured to:
    decompress the virtual curved and compressed image into a real image having a parabolic image decompression; and
    project the real image having the parabolic image decompression; and
  an image sensor positioned to receive the real image having the parabolic image decompression from the decompression lens;
  wherein the real image has a second diameter at the image sensor that is less than the first diameter;
  wherein the first diameter of the convex reflector is at most 32.4 millimeters; and
  wherein a ratio of the first diameter to the second diameter is between 6.5:1 and 2.3:1.

16. The optical system of claim 15, wherein the optical system provides a polychromatic modulation transfer function of 30% or more for 150 cy/mm.

17. The optical system of claim 15, further comprising a hardware aperture (i) spaced a distance from the convex reflector and (ii) positioned between the convex reflector and the decompression lens, the hardware aperture positioned to filter out light rays other than those reflected directly from the convex reflector, wherein the decompression lens is positioned to receive the virtual curved and compressed image filtered by the hardware aperture.

18. An optical system for a camera, the optical system comprising:
  a housing; and
  an optical assembly disposed within the housing, the optical assembly including:
    a convex reflector having (i) a first diameter and (ii) a hyperbolic shaped surface, wherein the convex reflector provides a virtual curved and compressed image of a scene having a hyperbolic image compression;
    a hardware aperture spaced a distance from the convex reflector, the hardware aperture positioned to filter out light rays other than the light rays reflected directly from the convex reflector; and
    a decompression lens positioned to receive the virtual curved and compressed image filtered by the hardware aperture, the decompression lens configured to:
      decompress the virtual curved and compressed image into a real image having a parabolic image decompression; and
      project the real image having the parabolic image decompression;
    an image sensor positioned to receive the real image from the decompression lens;
  wherein the real image has a second diameter at the image sensor that is less than the first diameter, a ratio of the first diameter to the second diameter is between 6.5:1 and 2.3:1, and the first diameter of the convex reflector is at most 32.4 millimeters;
  wherein a length of the optical assembly is at most 60 millimeters; and
  wherein the housing has a volume of at most approximately 49.16 cubic centimeters.

19. The optical system of claim 18, wherein the optical assembly includes a catadioptric optical element including the convex reflector, a first refractive surface, and a second refractive surface.

20. The optical system of claim 19, wherein at least one of the first refractive surface has an ellipsoidal shape or the second refractive surface has a spherical shape.

* * * * *